US012761703B2

(12) United States Patent
Shi et al.

(10) Patent No.: US 12,761,703 B2
(45) Date of Patent: Oct. 13, 2026

(54) HINGE MECHANISM AND ELECTRONIC DEVICE

(71) Applicant: Huawei Technologies Co., Ltd., Shenzhen (CN)

(72) Inventors: Tuo Shi, Shanghai (CN); Jiangbo Chen, Hangzhou (CN); Qiang Zhan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 18/936,172

(22) Filed: Nov. 4, 2024

(65) Prior Publication Data

US 2025/0060795 A1 Feb. 20, 2025

Related U.S. Application Data

(63) Continuation of application No. PCT/CN2024/079738, filed on Mar. 1, 2024.

(30) Foreign Application Priority Data

Jun. 26, 2023 (CN) ......................... 202310763134.8

(51) Int. Cl.
*G06F 1/16* (2006.01)

(52) U.S. Cl.
CPC .......... *G06F 1/1681* (2013.01); *G06F 1/1618* (2013.01); *G06F 1/1652* (2013.01)

(58) Field of Classification Search
None
See application file for complete search history.

(56) References Cited

U.S. PATENT DOCUMENTS

| | | | | |
|---|---|---|---|---|
| 2022/0303371 A1* | 9/2022 | Liao | .................... | H04M 1/0216 |
| 2023/0037174 A1* | 2/2023 | Shen | ...................... | G06F 1/1652 |
| 2025/0155938 A1* | 5/2025 | Wu | ........................ | G06F 1/1681 |

FOREIGN PATENT DOCUMENTS

| | | | | |
|---|---|---|---|---|
| CN | 111043149 A | 4/2020 | | |
| CN | 111997991 A | 11/2020 | | |
| CN | 112901643 A | 6/2021 | | |
| CN | 113542456 A | 10/2021 | | |
| CN | 113805646 A | 12/2021 | | |
| CN | 114185398 A * | 3/2022 | ........... | G06F 1/1616 |
| CN | 115126770 A | 9/2022 | | |
| CN | 115492841 A | 12/2022 | | |

(Continued)

*Primary Examiner* — Imani N Hayman
*Assistant Examiner* — Rashen E Morrison
(74) *Attorney, Agent, or Firm* — Slater Matsil, LLP

(57) ABSTRACT

A hinge mechanism includes a main shaft assembly, a first housing fastening bracket, a rotating module, and a first damping assembly. The rotating module includes a first swing arm, the first swing arm is rotatably connected to the main shaft assembly, and the first swing arm is slidably connected to the first housing fastening bracket. The first damping assembly includes a first cam, a second cam, a first elastic member, and a first limiting block, the first cam is disposed on a side that is of the first swing arm, the second cam is located on a side that is of the first cam and that is away from the first swing arm, the second cam is slidably disposed on the first housing fastening bracket in a axial direction of the hinge mechanism, a cam surface of the second cam abuts against a cam surface of the first cam.

20 Claims, 11 Drawing Sheets

(56) References Cited

FOREIGN PATENT DOCUMENTS

| | | | |
|---|---|---|---|
| CN | 116517948 | A | 8/2023 |
| CN | 117006149 | A | 11/2023 |
| EP | 3842647 | A1 | 6/2021 |
| JP | 2021038774 | A | 3/2021 |

* cited by examiner

HINGE MECHANISM AND ELECTRONIC DEVICE

CROSS-REFERENCE TO RELATED APPLICATIONS

This application is a continuation of International Application No. PCT/CN2024/079738, filed on Mar. 1, 2024, which claims priority to Chinese Patent Application No. 202310763134.8, filed on Jun. 26, 2023. The disclosures of the aforementioned applications are hereby incorporated by reference in their entireties.

TECHNICAL FIELD

This application relates to the field of electronic device technologies, and in particular, to a hinge mechanism and an electronic device.

BACKGROUND

With gradual maturation of flexible display technologies, a display mode of an electronic device is driven to greatly change. A mobile phone with a foldable flexible display, a tablet computer with a foldable flexible display, a wearable electronic device with a foldable flexible display, and the like are an important evolution direction of intelligent electronic devices in the future.

A hinge mechanism, as a key component for implementing closing and unfolding functions of a foldable electronic device, may be configured to change a folding status of the electronic device, and may further provide sufficient damping force for the entire electronic device in different use states, so that the electronic device has reliable support force in a process of switching the folding status. However, as the electronic device continuously develops to be light and thin, the hinge mechanism also needs to be correspondingly thinned in size to match a thin electronic device. However, it is difficult for a structure that usually has a large size and that is used to provide damping resistance in the current hinge mechanism to adapt to a development trend of lightness and thinness of the hinge mechanism and the electronic device.

SUMMARY

This application provides a hinge mechanism and an electronic device, to improve unfolding and closing stability of the hinge mechanism and reduce a size of the hinge mechanism.

According to a first aspect, this application provides a hinge mechanism. The hinge mechanism may include a main shaft assembly, a first housing fastening bracket, a second housing fastening bracket, a rotating module, and a damping module. The first housing fastening bracket and the second housing fastening bracket may be respectively disposed on two sides of the main shaft assembly. The rotating module may include a first swing arm and a second swing arm, where the first swing arm is rotatably connected to the main shaft assembly, the first swing arm is slidably connected to the first housing fastening bracket, the second swing arm is rotatably connected to the main shaft assembly, and the second swing arm is slidably connected to the second housing fastening bracket. The damping module may include a first damping assembly and a second damping assembly, where the first damping assembly includes a first cam, a second cam, a first elastic member, and a first limiting block, the first cam may be disposed on a side that is of the first swing arm and that is in an axial direction of the hinge mechanism, the second cam is located on a side that is of the first cam and that is away from the first swing arm, the second cam is slidably disposed on the first housing fastening bracket in the axial direction of the hinge mechanism, a cam surface of the second cam abuts against a cam surface of the first cam, the first limiting block is located on a side that is of the second cam and that is away from the first swing arm, the first limiting block is fastened to the first housing fastening bracket, and two ends of the first elastic member respectively abut against the second cam and the first limiting block. The second damping assembly includes a third cam, a fourth cam, a second limiting member, and a second limiting block, the third cam may be disposed on a side that is of the second swing arm and that is in the axial direction of the hinge mechanism, the fourth cam may be located on a side that is of the third cam and that is away from the second swing arm, the fourth cam is slidably disposed on the second housing fastening bracket in the axial direction of the hinge mechanism, a cam surface of the fourth cam abuts against a cam surface of the third cam, the second limiting block is located on a side that is of the fourth cam and that is away from the second swing arm, the second limiting block is fastened to the second housing fastening bracket, and two ends of the second elastic member respectively abut against the fourth cam and the second limiting block.

When the hinge mechanism provided in this application is used in an electronic device, in a process of closing the electronic device, the first housing fastening bracket and the second housing fastening bracket move toward each other, the first housing fastening bracket drives the first swing arm to rotate clockwise, and the second housing fastening bracket drives the second swing arm to rotate anticlockwise. With the rotation of the first swing arm and the second swing arm, the first cam can push the second cam toward the first limiting block, to compress the first elastic member, and the second swing arm can push the fourth cam toward the second limiting block, to compress the second elastic member. In this way, a user can have an obvious operation feeling when closing the electronic device. In a process of unfolding the electronic device, the first elastic member gradually rebounds in the compressed state, and releases accumulated elastic potential energy, to push the second cam to slide toward the first cam, and the second elastic member gradually rebounds in the compressed state, and releases accumulated elastic potential energy, to push the fourth cam to slide toward the third cam. In this way, the second cam can apply torsion force to the first cam and the first swing arm to facilitate rotation of the first cam and the first swing arm, and the fourth cam can apply torsion force to the third cam and the second swing arm to facilitate rotation of the third cam and the second swing arm, so as to provide specific unfolding assistance for the electronic device. Therefore, difficulty of an unfolding operation of the electronic device is reduced.

In addition, in this application, cam surfaces of the first cam and the second cam are properly designed, so that the first cam and the first swing arm can suspend at a specified angle, that is, the first rotating assembly suspends. Similarly, cam surfaces of the third cam and the fourth cam are properly designed, so that the third cam and the second swing arm can suspend at a specified angle, that is, the second rotating assembly suspends. In an electronic device in which the hinge mechanism is used, a suspendable design of the first rotating assembly and the second rotating assembly may be used to enable the electronic device to be positioned in some intermediate states, thereby helping improve user experience.

In some implementation solutions, the first housing fastening bracket may be provided with a first limiting slot, the first limiting slot extends in the axial direction of the hinge mechanism, and the first limiting slot has a first opening provided facing the first swing arm. The first limiting block may be fastened in the first limiting slot, the second cam may be slidably disposed in the first limiting slot, and the cam surface of the second cam may abut against the cam surface of the first cam through the first opening. In this way, the first limiting slot may be used to limit a movement direction of the second cam driven by the first elastic member, and the second cam and the first housing fastening bracket may overlap or partially overlap in a thickness direction of the hinge mechanism, to help reduce a thickness of the hinge mechanism.

Similarly, the second housing fastening bracket may be provided with a second limiting slot, the second limiting slot extends in the axial direction of the hinge mechanism, and the second limiting slot has a second opening provided facing the second swing arm. The second limiting block may be fastened in the second limiting slot, the fourth cam may be slidably disposed in the second limiting slot, and the cam surface of the fourth cam may abut against the cam surface of the third cam through the second opening. In this way, the second limiting slot may be used to limit a movement direction of the fourth cam driven by the second elastic member, and the fourth cam and the second housing fastening bracket may overlap or partially overlap in a thickness direction of the hinge mechanism, to help reduce a thickness of the hinge mechanism.

In some implementation solutions, a slot wall that is of the first limiting slot and that is disposed opposite to the first opening may form the first limiting block. This design can simplify a structure of the hinge mechanism, and help improve structural compactness of the hinge mechanism. Based on a same principle, a slot wall that is of the second limiting slot and that is disposed opposite to the second opening may form the second limiting block.

In some implementation solutions, a slot wall of the first limiting slot may be provided with a first guide slot extending in the axial direction of the hinge mechanism, the second cam may be provided with a first guide block, and the first guide block is slidably disposed in the first guide slot, so that the first guide slot is used to provide guide for sliding of the second cam in the first limiting slot. Similarly, a slot wall of the second limiting slot may be provided with a second guide slot extending in the axial direction of the hinge mechanism, the fourth cam may be provided with a second guide block, and the second guide block is slidably disposed in the second guide slot, so that the second guide slot is used to provide guide for sliding of the fourth cam in the second limiting slot.

In some implementation solutions, a first groove may be provided on a side that is of the second cam and that faces the first housing fastening bracket, a second groove may be provided at a position that is on the first housing fastening bracket and that corresponds to the first groove, and the first elastic member may be located in space enclosed by the first groove and the second groove. In this design, depths of the first groove and the second groove are small, and therefore, a thickness of the second cam and a thickness of the first housing fastening bracket may be appropriately reduced, to help reduce an overall thickness of the hinge mechanism. Similarly, a third groove may be provided on a side that is of the fourth cam and that faces the second housing fastening bracket, a fourth groove may be provided at a position that is on the second housing fastening bracket and that corresponds to the third groove, and the second elastic member may be located in space enclosed by the third groove and the fourth groove. In this design, depths of the third groove and the fourth groove are small, and therefore, a thickness of the fourth cam and a thickness of the second housing fastening bracket may be appropriately reduced, to help reduce an overall thickness of the hinge mechanism.

For example, when the first housing fastening bracket is provided with the first limiting slot, a bottom wall of the first limiting slot may be provided with the second groove. Similarly, when the second housing fastening bracket is provided with a second limiting slot, a bottom wall of the second limiting slot may be provided with the fourth groove.

In some implementation solutions, the first housing fastening bracket may be further provided with a first avoidance groove, and the first avoidance groove may communicate with the first guide slot. When the first cam is mounted in the first limiting slot, the first avoidance groove may avoid the first guide block of the second cam, so that the first guide block of the second cam smoothly enters the first guide slot through the first avoidance groove. In this way, difficulty of mounting the second cam on the first housing fastening bracket is reduced. The second housing fastening bracket may be further provided with a second avoidance groove, and the second avoidance groove communicates with the second guide slot. When the fourth cam is mounted in the second limiting slot, the second avoidance groove may avoid the second guide block of the fourth cam, so that the second guide block of the fourth cam smoothly enters the second guide slot. In this way, difficulty of mounting the fourth cam on the second housing fastening bracket is reduced.

In some implementation solutions, the first cam may be fastened to a side surface of the first swing arm through bonding, welding, riveting or the like. Alternatively, the first cam and the first swing arm may be of an integrated structure. Similarly, the third cam may be fastened to a side surface of the second swing arm through bonding, welding, riveting or the like. Alternatively, the third cam and the second swing arm may also be of an integrated structure.

In some implementation solutions, there may be two first damping assemblies in the damping module, and the two first damping assemblies may be symmetrically disposed on two sides that are of the first swing arm and that are in the axial direction of the hinge mechanism, so that force on the two sides of the first swing arm is balanced, a jamming risk of the first swing arm is reduced, and motion reliability of the first swing arm is improved. Similarly, there may be two second damping assemblies in the damping module, and the two second damping assemblies may be symmetrically disposed on two sides that are of the second swing arm and that are in the axial direction of the hinge mechanism, so that force on the two sides of the second swing arm is balanced, a jamming risk of the second swing arm is reduced, and motion reliability of the second swing arm is improved.

In some implementation solutions, the rotating module may further include a first support arm, a second support arm, a first connector, and a second connector. The first support arm may be rotatably connected to the second housing fastening bracket, the first connector is located between the first swing arm and the first support arm, and the first connector is rotatably connected to the first swing arm and the first support arm separately. The main shaft assembly is provided with a first track slot, and the first connector may move along the first track slot, to limit a movement track of the first connector through the first track slot. The second support arm may be rotatably connected to the second housing fastening bracket, the second connector is located between the second swing arm and the second support arm, and the second connector is rotatably connected to the second swing arm and the second support part separately. The main shaft assembly is further provided with a second track slot, and the second connector may move along the second track slot, to limit a movement track of the second connector through the second track slot.

Based on the hinge mechanism in this application, in a process in which the electronic device rotates from an unfolded state to a closed state, the first housing fastening bracket and the second housing fastening bracket move toward each other. When the first housing fastening bracket drives the first swing arm to rotate clockwise around the main shaft assembly, the first swing arm may drive the first connector to move toward the first swing arm in the first track slot of the main shaft assembly, so as to drive the first support arm to rotate anticlockwise around the main shaft assembly. When the second housing fastening bracket drives the second swing arm to rotate anticlockwise around the main shaft assembly, the second swing arm may drive the second connector to move toward the second swing arm in the second track slot of the main shaft assembly, so as to drive the second support arm to rotate clockwise around the main shaft assembly. In a process in which the electronic device rotates from a closed state to an unfolded state, the first housing fastening bracket and the second housing fastening bracket move away from each other. When the first housing fastening bracket drives the first swing arm to rotate anticlockwise around the main shaft assembly, the first swing arm may drive the first connector to move toward the first support arm in the first track slot of the main shaft assembly, so as to drive the first support arm to rotate clockwise around the main shaft assembly. When the second housing fastening bracket drives the second swing arm to rotate clockwise around the main shaft assembly, the second swing arm may drive the second connector to move toward the second support arm in the second track slot of the main shaft assembly, so as to drive the second support arm to rotate anticlockwise around the main shaft assembly. In this way, folding and unfolding functions of the hinge mechanism can be implemented.

For some existing hinge mechanisms, to ensure stability of the mechanism, a thickness of a rotating assembly connected to the main shaft assembly needs to be increased. In this way, both the main shaft assembly and the hinge mechanism are very heavy. If the main shaft assembly and the hinge mechanism are forcibly thinned, strength of the rotating assembly is likely to be reduced. This greatly affects reliability of the hinge mechanism, and shortens a lifespan of the electronic device. The hinge mechanism in this application has a simplified structure. Based on the foregoing structural relationship, when the first connector and the second connector slide in the main shaft assembly, the first swing arm, the second swing arm, the first support arm, and the second support arm on the left and right sides may accordingly move. Therefore, through-thickness cross sections of the first connector and the second connector do not need to be very thick, so that the first connector and the second connector shuttle in the first track slot and the second track slot of the main shaft assembly. In addition, because the first connector and the second connector respectively have connection relationships with the first swing arm (the second swing arm) and the first support arm (the second support arm), the first connector (the second connector) has a sufficient length extension in a direction perpendicular to an axial direction, and has sufficient strength, to ensure reliability of the hinge mechanism. In this way, a thickness of the main shaft assembly and an overall thickness can be reduced, and reliability of the hinge mechanism can be maintained, so that the entire hinge mechanism is light and thin and reliable.

In addition, because the first connector may move in the first track slot based on a specified trajectory, and the second connector may move in the second track slot based on a specified trajectory, motions of the first connector and the second connector in the entire folding and unfolding process may be prevented from being uncontrolled. Therefore, motion randomness of the first housing fastening bracket and the second housing fastening bracket is avoided, and structure and motion stability of the entire hinge mechanism is ensured. In some cases, the first track slot and the second track slot are properly designed, so that an outer tangent line of the hinge mechanism can keep a constant length in the entire folding and unfolding process, and a flexible display covering a surface of the hinge mechanism can also basically keep a length unchanged. This can effectively avoid squeezing or pulling on the flexible display, to improve structural reliability of the flexible display and further improve structural reliability of the electronic device.

In some implementation solutions, the main shaft assembly includes a base and a cover plate, the cover plate covers the base, the base is provided with a first arc-shaped groove, the cover plate includes a first protrusion disposed facing the first arc-shaped groove, and a gap between a surface of the first protrusion and a groove surface of the first arc-shaped groove may be used as the first track slot. In addition, the first connector may include a first arc-shaped surface and a second arc-shaped surface. When the electronic device is in an unfolded state and a closed state, the first arc-shaped surface abuts against the surface of the first protrusion, and the second arc-shaped surface abuts against the groove surface of the first arc-shaped groove. In this way, the surface of the first protrusion and the groove surface of the first arc-shaped groove limit the first connector to the first track slot, so that when the hinge mechanism is in the unfolded state and the closed state, the first connector has a stable position, and does not shake due to a gap. Therefore, reliability of the hinge mechanism in the foregoing two states is improved.

In addition, the base may further be provided with a third arc-shaped groove, and the cover plate further includes a third protrusion disposed facing the third arc-shaped groove. In this case, a gap between a surface of the third protrusion and a groove surface of the third arc-shaped groove is used as the second track slot. The second connector includes a third arc-shaped surface and a fourth arc-shaped surface, and when the electronic device is in the unfolded state and the closed state, the third arc-shaped surface abuts against the surface of the third protrusion, and the fourth arc-shaped surface abuts against the groove surface of the third arc-shaped groove. In this way, the surface of the third protrusion and the groove surface of the third arc-shaped groove limit the second connector to the second track slot, so that when the hinge mechanism is in the unfolded state and the closed state, the second connector has a stable position, and does not shake due to a gap. Therefore, reliability of the hinge mechanism in the foregoing two states is improved.

In some implementation solutions, in a process in which the electronic device rotates from the unfolded state to the closed state, the first arc-shaped surface abuts against the surface of the first protrusion, and there is a gap between the second arc-shaped surface and the groove surface of the first arc-shaped groove. However, in a process in which the electronic device rotates from the closed state to the unfolded state, the second arc-shaped surface abuts against the groove surface of the first arc-shaped groove, and there is a gap between the first arc-shaped surface and the surface of the first protrusion. Therefore, a movement track of the first connector in the first track slot in the process in which the electronic device rotates from the unfolded state to the closed state is different from a movement track of the first connector in the first track slot in the process in which the electronic device rotates from the closed state to the unfolded state. This helps improve flexibility of designing a hinge mechanism.

In addition, in the process in which the electronic device rotates from the unfolded state to the closed state, the third arc-shaped surface abuts against the surface of the third protrusion, and there is a gap between the fourth arc-shaped surface and the groove surface of the third arc-shaped groove. However, in the process in which the electronic device rotates from the closed state to the unfolded state, the fourth arc-shaped surface abuts against the groove surface of the third arc-shaped groove, and there is a gap between the third arc-shaped surface and the surface of the third protrusion. Therefore, a movement track of the second connector in the second track slot in the process in which the electronic device rotates from the unfolded state to the closed state is different from a movement track of the second connector in the second track slot in the process in which the electronic device rotates from the closed state to the unfolded state. This helps improve flexibility of designing a hinge mechanism.

In some implementation solutions, a movement track of the first connector in the first track slot in the process in which the electronic device rotates from the unfolded state to the closed state may be further enabled to be the same as a movement track of the first connector in the first track slot in the process in which the electronic device rotates from the closed state to the unfolded state. Specifically, the surface of the first protrusion is equidistant from the groove surface of the first arc-shaped groove. In this case, the first track slot is an equal-width slot. In a process in which the electronic device rotates from the unfolded state to the closed state and in a process in which the electronic device rotates from the closed state to the unfolded state, the first arc-shaped surface abuts against the surface of the first protrusion, and the second arc-shaped surface abuts against the groove surface of the first arc-shaped groove. This can help improve stability of motion of the first connector in the first track slot. Similarly, the surface of the third protrusion may be equidistant from the groove surface of the third arc-shaped groove, so that the second track slot is an equal-width slot. In addition, in a process in which the electronic device rotates from the unfolded state to the closed state and in a process in which the electronic device rotates from the closed state to the unfolded state, the third arc-shaped surface abuts against the surface of the third protrusion, and the fourth arc-shaped surface abuts against the groove surface of the third arc-shaped groove. In this way, a movement track of the second connector in the second track slot in the process in which the electronic device rotates from the unfolded state to the closed state is the same as a movement track of the second connector in the second track slot in the process in which the electronic device rotates from the closed state to the unfolded state. Therefore, stability of motion of the second connector in the second track slot is improved.

In some implementation solutions, the first arc-shaped surface of the first connector may be a circular arc-shaped surface, and the second arc-shaped surface may also be a circular arc-shaped surface. In this case, a sum of a radius of the first arc-shaped surface and a radius of the second arc-shaped surface may be equal to the distance between the surface of the first protrusion and the groove surface of the first arc-shaped groove, to improve smoothness of motion of the first connector in the first track slot.

Similarly, the third arc-shaped surface of the second connector may be a circular arc-shaped surface, and the fourth arc-shaped surface may also be a circular arc-shaped surface. In this case, a sum of a radius of the third arc-shaped surface and a radius of the fourth arc-shaped surface may be equal to the distance between the surface of the third protrusion and the groove surface of the third arc-shaped groove, to improve smoothness of motion of the second connector in the second track slot.

In some implementation solutions, the first swing arm is rotatably connected to the main shaft assembly. The base is provided with a second arc-shaped groove, the first swing arm includes a first arc-shaped rotating block, the first arc-shaped rotating block is accommodated in the second arc-shaped groove, and the first arc-shaped rotating block may slide along a groove surface of the second arc-shaped groove to implement a rotatable connection between the first swing arm and the main shaft assembly. In this way, the first swing arm is rotatably connected to the main shaft assembly through a virtual axis. This helps reduce space occupied by the first swing arm on the main shaft assembly, and helps implement a miniaturization design of the hinge mechanism.

In addition, the second swing arm is also rotatably connected to the main shaft assembly. The base is provided with a fourth arc-shaped groove. The second swing arm includes a second arc-shaped rotating block, the second arc-shaped rotating block is accommodated in the fourth arc-shaped groove, and the second arc-shaped rotating block may slide along a groove surface of the fourth arc-shaped groove to implement a rotatable connection between the second swing arm and the main shaft assembly. In this way, the second swing arm is rotatably connected to the main shaft assembly through a virtual axis. This helps reduce space occupied by the second swing arm on the main shaft assembly, and helps implement a miniaturization design of the hinge mechanism.

To improve reliability of a connection between the first swing arm and the main shaft assembly, in this application, the cover plate further includes a second protrusion disposed facing the second arc-shaped groove, and at least a part of the first arc-shaped rotating block is located between the second protrusion and the second arc-shaped groove, so that the first swing arm is limited to the main shaft assembly through the second protrusion and the second arc-shaped groove. Therefore, the first swing arm can be prevented from falling off from the second arc-shaped groove.

In addition, the cover plate further includes a fourth protrusion disposed facing the fourth arc-shaped groove, and at least a part of the second arc-shaped rotating block is located between the fourth protrusion and the fourth arc-shaped groove, so that the second swing arm is limited to the main shaft assembly through the fourth protrusion and the fourth arc-shaped groove. Therefore, the second swing arm can be prevented from falling off from the fourth arc-shaped groove.

In some implementation solutions, the first connector includes a fifth rotating shaft and a sixth rotating shaft, the first connector is rotatably connected to the first swing arm by using a first rotating shaft, the first connector is rotatably connected to the first support arm by using the fifth rotating shaft, and an axis of the fifth rotating shaft and an axis of the sixth rotating shaft are parallel to each other, but do not coincide with each other, so that the first swing arm and the first support arm can pull each other by using the first connector.

The second connector includes a seventh rotating shaft and an eighth rotating shaft, the second connector is rotatably connected to the second swing arm by using the seventh rotating shaft, the second connector is rotatably connected to the second support arm by using the eighth rotating shaft, and an axis of the seventh rotating shaft and an axis of the eighth rotating shaft are parallel to each other, but do not coincide with each other, so that the second swing arm and the second support arm can pull each other by using the second connector.

Specifically, when the first swing arm is rotatably connected to the first connector by using the fifth rotating shaft, the first arc-shaped rotating block may be provided with a first mounting slot, and a slot opening of the first mounting slot is provided facing the second arc-shaped groove. The fifth rotating shaft is mounted in the first mounting slot, a part of a surface of the fifth rotating shaft is in contact with a slot surface of the first mounting slot, and a part of a surface of the fifth rotating shaft is in contact with the groove surface of the second arc-shaped groove. The fifth rotating shaft is mounted in the first mounting slot of the first arc-shaped rotating block, so that a size of the first arc-shaped rotating block can be effectively reduced, and a thickness of the first mounting slot does not need to be increased due to a size of the first rotating shaft. This facilitates a miniaturization design of the hinge mechanism.

In addition, the slot surface of the first mounting slot includes a first circular arc-shaped surface, a surface that is of the fifth rotating shaft and that is configured to be in contact with the slot surface of the first mounting slot is a second circular arc-shaped surface, and a circle center of the first circular arc-shaped surface coincides with a circle center of the second circular arc-shaped surface. In this way, the fifth rotating shaft may rotate relative to the first arc-shaped rotating block in a process in which the first arc-shaped rotating block slides along the groove surface of the second arc-shaped groove, to implement a rotatable connection between the first swing arm and the fifth rotating shaft.

The groove surface of the second arc-shaped groove is a third circular arc-shaped surface, a surface that is of the fifth rotating shaft and that is configured to be in contact with the groove surface of the second arc-shaped groove is a fourth circular arc-shaped surface, and a circle center of the third circular arc-shaped surface coincides with a circle center of the fourth circular arc-shaped surface. In this way, when the fifth rotating shaft slides along the groove surface of the second arc-shaped groove with the first arc-shaped rotating block, the fifth rotating shaft may further rotate relative to the first arc-shaped rotating block and the second arc-shaped groove, so that the first connector moves relative to the main shaft assembly.

Similarly, the second arc-shaped rotating block is provided with a second mounting slot, a slot opening of the second mounting slot is provided facing the fourth arc-shaped groove, the seventh rotating shaft is mounted in the second mounting slot, a part of a surface of the seventh rotating shaft is in contact with the slot surface of the second mounting slot, and a part of a surface of the seventh rotating shaft is in contact with the groove surface of the fourth arc-shaped groove. The seventh rotating shaft is mounted in the second mounting slot of the second arc-shaped rotating block, so that a size of the second arc-shaped rotating block can be effectively reduced, and a thickness of the second mounting slot does not need to be increased due to a size of a third rotating shaft. This facilitates a miniaturization design of the hinge mechanism.

The second mounting slot may include a fifth circular arc-shaped surface, a surface that is of the seventh rotating shaft and that is configured to be in contact with the slot surface of the second mounting slot is a sixth circular arc-shaped surface, and a circle center of the fifth circular arc-shaped surface coincides with a circle center of the sixth circular arc-shaped surface. In addition, the groove surface of the fourth arc-shaped groove is a seventh circular arc-shaped surface, and a surface that is of the seventh rotating shaft and that is configured to be in contact with the groove surface of the fourth arc-shaped groove may be an eighth circular arc-shaped surface. In this case, a circle center of the seventh circular arc-shaped surface coincides with a circle center of the eighth circular arc-shaped surface. In this way, when the seventh rotating shaft slides with the second arc-shaped rotating block along the groove surface of the fourth arc-shaped groove, the seventh rotating shaft may further rotate relative to the second arc-shaped rotating block and the fourth arc-shaped groove, to facilitate movement of the second connector relative to the main shaft assembly.

According to a second aspect, this application further provides an electronic device. The electronic device includes a first housing, a second housing, a flexible display, and the hinge mechanism in the first aspect, where the first housing and the second housing are respectively disposed on two opposite sides of the hinge mechanism, a first housing fastening bracket is fastened to the first housing, and a second housing fastening bracket is fastened to the second housing. A flexible display continuously covers the first housing, the second housing, and the hinge mechanism, and the flexible display is fastened to the first housing and the second housing. When the electronic device is in an unfolded state, the hinge mechanism, the first housing, and the second housing jointly support the flexible display smoothly, so as to ensure that a form of the electronic device in the unfolded state is complete. In a process in which the electronic device rotates from the unfolded state to a closed state, the two housings synchronously rotate toward each other to drive the flexible display to rotate, and in a process in which the electronic device rotates from the closed state to the unfolded state, the two housings synchronously rotate away from each other to drive the flexible display to rotate, so that deformation of the flexible display can be effectively avoided and a risk of damage to the flexible display is reduced.

REFERENCE NUMERALS

Figure 1:
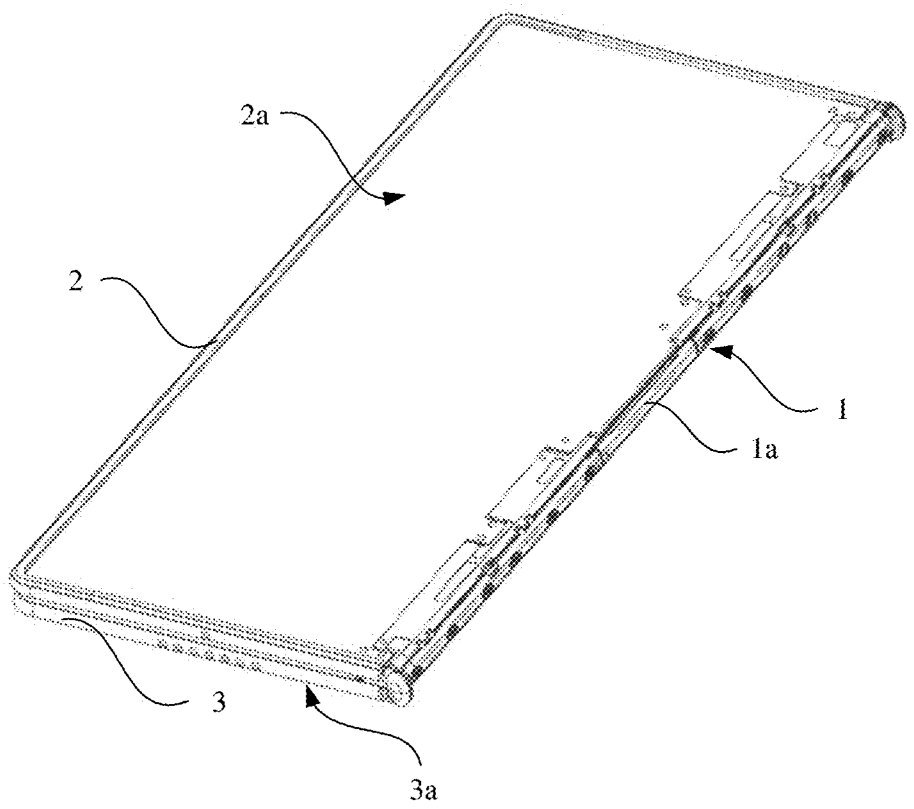
FIG. 1 is a diagram of a structure of an electronic device in a closed state according to an embodiment of this application.

1: hinge mechanism; 1*a*: bearing surface; 1*b*: third appearance surface; 101: rotating module; 1011: first rotating assembly; 10111: first swing arm;

101111: first arc-shaped rotating block; 1011111: first concave part; 1011112: first mounting slot; 10111121: first circular arc-shaped surface;

10112: first support arm; 10113: first connector; 101131: first rotating shaft; 1011311: second circular arc-shaped surface;

1011312: fourth circular arc-shaped surface; 101132: second rotating shaft; 101133: first arc-shaped surface; 101134: second arc-shaped surface;

1012: second rotating assembly; 10121: second swing arm; 101211: second arc-shaped rotating block; 1012111: second concave part;

1012112: second mounting slot; 10121121: fifth circular arc-shaped surface; 10122: second support arm; 10123: second connector;

101231: third rotating shaft; 1012311: sixth circular arc-shaped surface; 1012312: eighth circular arc-shaped surface; 101232: fourth rotating shaft;

101233: third arc-shaped surface; 101234: fourth arc-shaped surface; 1013: first housing fastening bracket; 10131: first sliding slot;

10132: first mounting part; 10133: first limiting slot; 101331: first opening; 101332: first guide slot;

10134: first avoidance slot; 10135: second groove; 1014: second housing fastening bracket; 10141: second sliding slot; 10142: second mounting part;

102: main shaft assembly; 1021: base; 10211: first arc-shaped groove; 102111: groove surface of the first arc-shaped groove; 10212: second arc-shaped groove;

102121: third circular arc-shaped surface; 10213: third arc-shaped groove; 102131: groove surface of the third arc-shaped groove; 10214: fourth arc-shaped groove;

102141: seventh circular arc-shaped surface; 1022: cover plate; 10221: first protruding part; 102211: surface of the first protruding part;

10222: second protruding part; 102221: surface of the second protruding part; 10223: first plug part; 10224: third protruding part;

102241: surface of the third protruding part; 10225: fourth protruding part; 102251: surface of the fourth protruding part; 1023: first track slot;

1024: second track slot; 103: damping module; 1031: first damping assembly; 10311: first cam; 103111: first cam surface;

10312: second cam; 103121: second cam surface; 103122: first guide block; 10313: first elastic member;

10314: first limiting block; 10315: first guide post; 1032: second damping assembly; 10321: third cam;

103211: third cam surface; 10322: fourth cam; 103221: fourth cam surface; 103222: second guide block;

10323: second elastic member; 10324: second limiting block; 10325: second guide post;

2: first housing; 2*a*: first support surface; 2*b*: first appearance surface;

3: second housing; 3*a*: second support surface; and 3*b*: second appearance surface.

DETAILED DESCRIPTION OF ILLUSTRATIVE EMBODIMENTS

To make the objectives, technical solutions, and advantages of this application clearer, the following further describes embodiments of this application in detail with reference to the accompanying drawings. However, example embodiments may be implemented in a plurality of forms and should not be construed as being limited to embodiments described herein. Identical reference numerals in the accompanying drawings denote identical or similar structures. Therefore, repeated descriptions thereof are omitted. Expressions of positions and directions in embodiments of this application are described by using the accompanying drawings as examples. However, changes may also be made as required, and all the changes fall within the protection scope of this application. The accompanying drawings in embodiments of this application are merely used to illustrate relative position relationships and do not represent an actual scale.

It should be noted that specific details are set forth in the following descriptions for ease of understanding this application. However, embodiments of this application can be implemented in a plurality of manners different from those described herein, and a person skilled in the art can perform similar generalization without departing from the connotation of embodiments of this application. Therefore, this application is not limited to the following disclosed specific implementations.

For ease of understanding a hinge mechanism provided in embodiments of this application, the following first describes an application scenario of the hinge mechanism. The hinge mechanism is used in, but is not limited to, a foldable electronic device like a mobile phone, a palmtop computer (PDA), a notebook computer, or a tablet computer. In this application, the electronic device may be an outward-foldable electronic device, or may be an inward-foldable electronic device. In a process in which the outward-foldable electronic device rotates from an unfolded state to a closed state, a flexible display is always located outside the electronic device. When the inward-foldable electronic device is in a closed state, a flexible display is located inside the electronic device. In embodiments of this application, the outward-foldable electronic device is used as an example to describe application of a hinge mechanism in the electronic device. FIG. 1 is a diagram of a structure of an electronic device in a closed state according to an embodiment of this application. In addition to a hinge mechanism 1, the electronic device may further include two housings and a flexible display. For ease of description, the two housings may be respectively named a first housing 2 and a second housing 3. The first housing 2 and the second housing 3 are located on two sides of the hinge mechanism 1, and can rotate around the hinge mechanism 1. When the electronic device is used, the electronic device may be closed and unfolded in different use scenarios.

FIG. 1 shows a relative position relationship between the hinge mechanism 1 and the two housings in a case in which the electronic device is in the closed state. In this case, a first surface of the hinge mechanism 1, a first surface of the first housing, and a first surface of the second housing may be jointly used as a support surface of the flexible display (not shown in FIG. 1). The flexible display is omitted in FIG. 1. The first surface of the hinge mechanism 1 is a surface that is of the hinge mechanism 1 and that faces the flexible display, the first surface of the first housing 2 is a surface that is of the first housing 2 and that faces the flexible display, and the first surface of the second housing 3 is a surface that is of the second housing 3 and that faces the flexible display. For ease of description, in this application, the first surface of the hinge mechanism 1 may be defined as a bearing surface 1*a* of the hinge mechanism 1, the first surface of the first housing 2 may be defined as a first support surface 2*a*, and the first surface of the second housing 3 may be defined as a second support surface 3*a*.

Figure 2A:
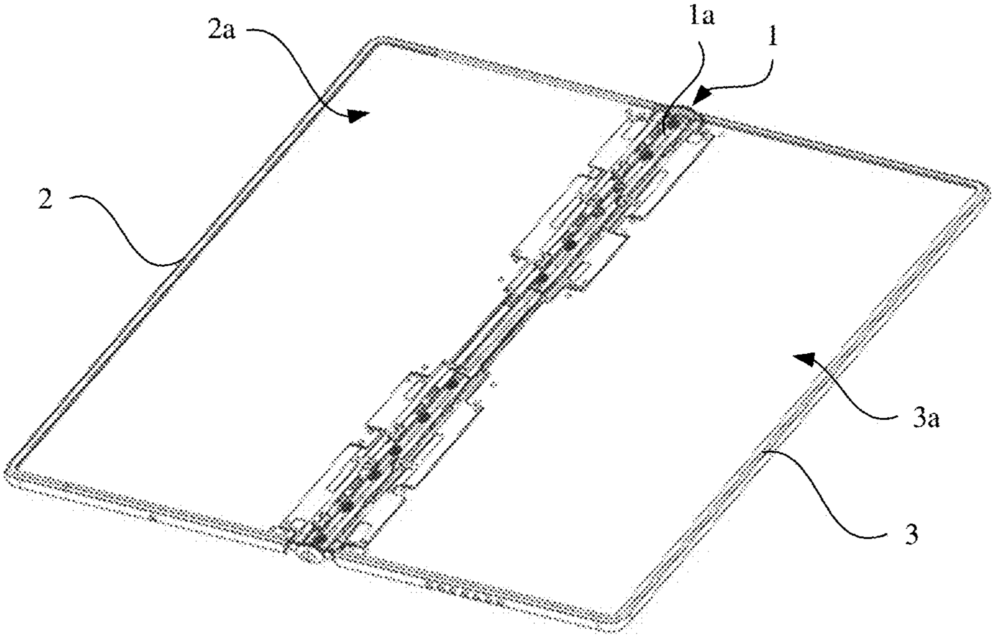
FIG. 2*a* is a diagram of a structure of an electronic device in an unfolded state according to an embodiment of this application.

FIG. 2*a* is a diagram of a structure of an electronic device in an unfolded state. FIG. 2*a* shows a structure on a side of the first support surface 2*a* of the first housing 2 and a structure on a side of the second support surface 3*a* of the second housing 3. In the unfolded state, the bearing surface 1*a* of the hinge mechanism 1, the first support surface 2*a* of the first housing 2, and the second support surface 3*a* of the second housing 3 may be connected to form a smooth support surface.

Based on this, the flexible display may continuously cover the bearing surface 1*a* of the hinge mechanism 1, the first support surface 2*a* of the first housing 2, and the second support surface 3*a* of the second housing 3. The hinge mechanism 1 is disposed corresponding to a bendable part of the flexible display, and the flexible display may be fastened to the first support surface 2*a* of the first housing 2 and the second support surface 3*a* of the second housing 3, and a connection manner may be but is not limited to bonding. In this way, when the electronic device is in the unfolded state shown in FIG. 2*a*, the hinge mechanism 1, the first housing 2, and the second housing 3 may smoothly support the flexible display.

Figure 2B:
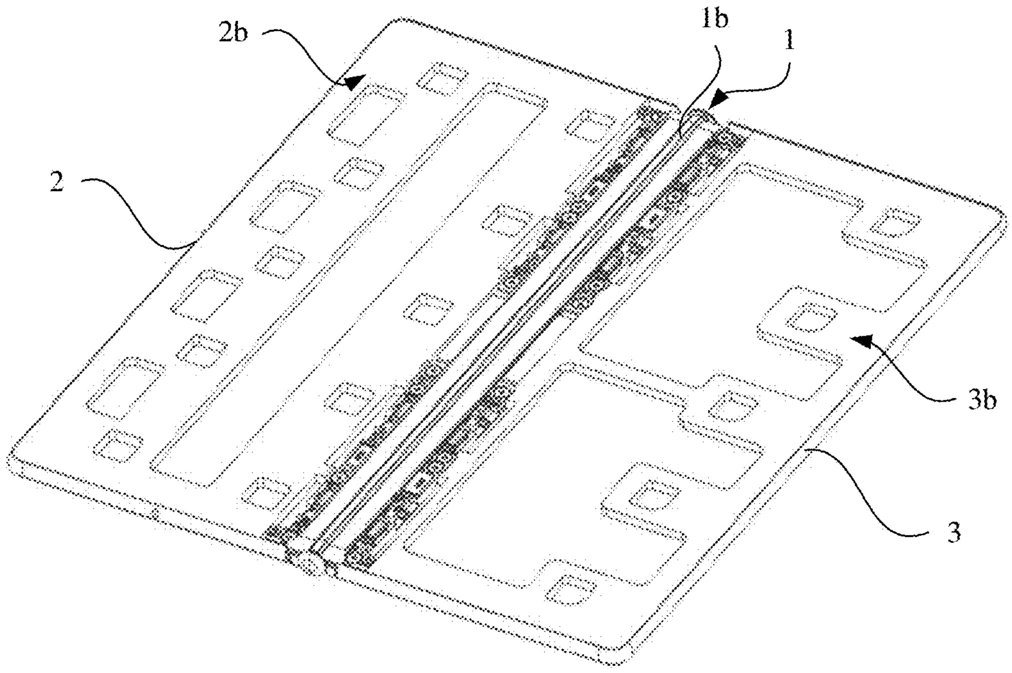
FIG. 2*b* is a diagram of another structure of an electronic device in an unfolded state according to an embodiment of this application.

In addition, FIG. 2*b* is a diagram of another structure of an electronic device in an unfolded state according to an embodiment of this application. FIG. 2*b* shows a structure on a side of a second surface of the hinge mechanism 1, a structure on a side of a second surface of the first housing 2, and a structure on a side of a second surface side of the second housing 3. The second surface of the hinge mechanism 1 is a surface that is of the hinge mechanism 1 and that is away from the flexible display, the second surface of the first housing 2 is a surface that is of the first housing 2 and that is away from the flexible display, and the second surface of the second housing 3 is a surface that is of the second housing 3 and that is away from the flexible display. In this case, the first surface and the second surface of the hinge mechanism 1 are disposed back to back, the first surface and the second surface of the first housing 2 are disposed back to back, and the first surface and the second surface of the second housing 3 are disposed back to back.

In this embodiment of this application, the second surface of the hinge mechanism 1, the second surface of the first housing 2, and the second surface of the second housing 3 may be used as appearance surfaces of the electronic device. For ease of description, the second surface of the first housing 2 may be defined as a first appearance surface 2*b*, the second surface of the second housing 3 may be defined as a second appearance surface 3*b*, and the second surface of the hinge mechanism 1 may be defined as a third appearance surface 1*b*. It may be understood that, for an outward-foldable electronic device, an appearance surface of the outward-foldable electronic device is exposed outside the electronic device when the electronic device is in an unfolded state, and an appearance surface of the outward-foldable electronic device is located inside the electronic device when the electronic device is in a closed state. In this application, in a process in which the first housing 2 and the second housing 3 rotate from the unfolded state shown in FIG. 2*a* or FIG. 2*b* to the closed state shown in FIG. 1, or from the closed state shown in FIG. 1 to the unfolded state shown in FIG. 2*a* or FIG. 2*b*, the flexible display may be bent or flattened with the first housing 2 and the second housing 3. In addition, it may be understood that the process in which the electronic device rotates from the unfolded state shown in FIG. 2*a* or FIG. 2*b* to the closed state shown in FIG. 1, or from the closed state shown in FIG. 1 to the unfolded state shown in FIG. 2*a* or FIG. 2*b* is a process in which the first housing 2 and the second housing 3 rotate around the hinge mechanism 1. As a key functional component in the foldable electronic device, the hinge mechanism 1 may be disposed corresponding to a foldable part of the flexible display. Therefore, the hinge mechanism 1 is important in supporting the foldable part of the flexible display in both the unfolded state shown in FIG. 2*a* or FIG. 2*b* and the closed state shown in FIG. 1.

Figure 3:
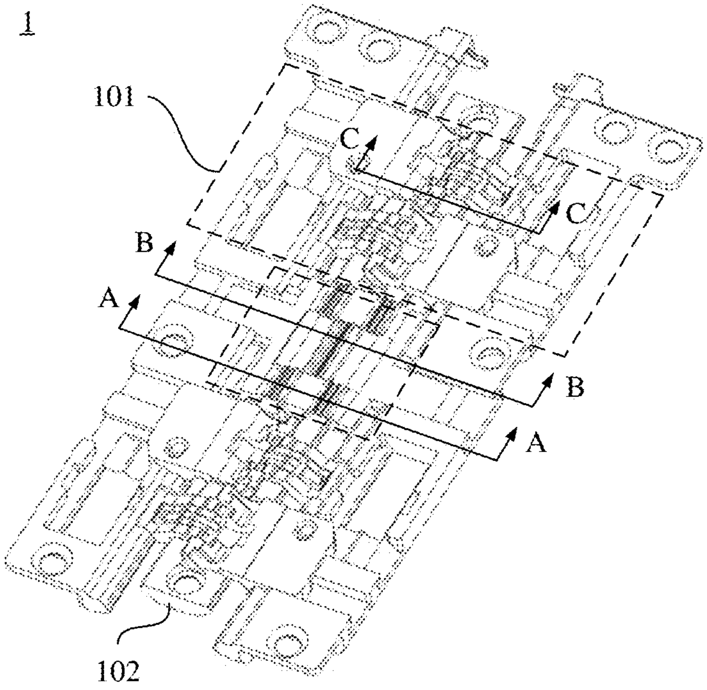
FIG. 3 is a diagram of a partial structure of a hinge mechanism of the electronic device in FIG. 2*b;*

FIG. 3 is a diagram of a partial structure of the hinge mechanism 1 of the electronic device in FIG. 2*b*. In this application, the hinge mechanism 1 may include a rotating module 101. A quantity of rotating modules 101 in the hinge mechanism 1 is not limited in this application. The hinge mechanism 1 may include one rotating module 101, or may include a plurality of rotating modules 101. When the hinge mechanism 1 includes a plurality of rotating modules 101, the plurality of rotating modules 101 may be arranged at intervals in an axial direction of the hinge mechanism 1. In this application, the axial direction of the hinge mechanism 1 is an extension direction of an axis through which the first housing 2 shown in FIG. 2*b* rotates around the hinge mechanism 1 and an axis through which the second housing 3 rotates around the hinge mechanism 1 shown in FIG. 2*b*. It may be understood that, the first housing 2 and the second housing 3 are rotatably connected by using the plurality of rotating modules 101, so that stability of rotation of the first housing 2 and the second housing 3 of the electronic device relative to the hinge mechanism 1 can be effectively improved.

Figure 4:
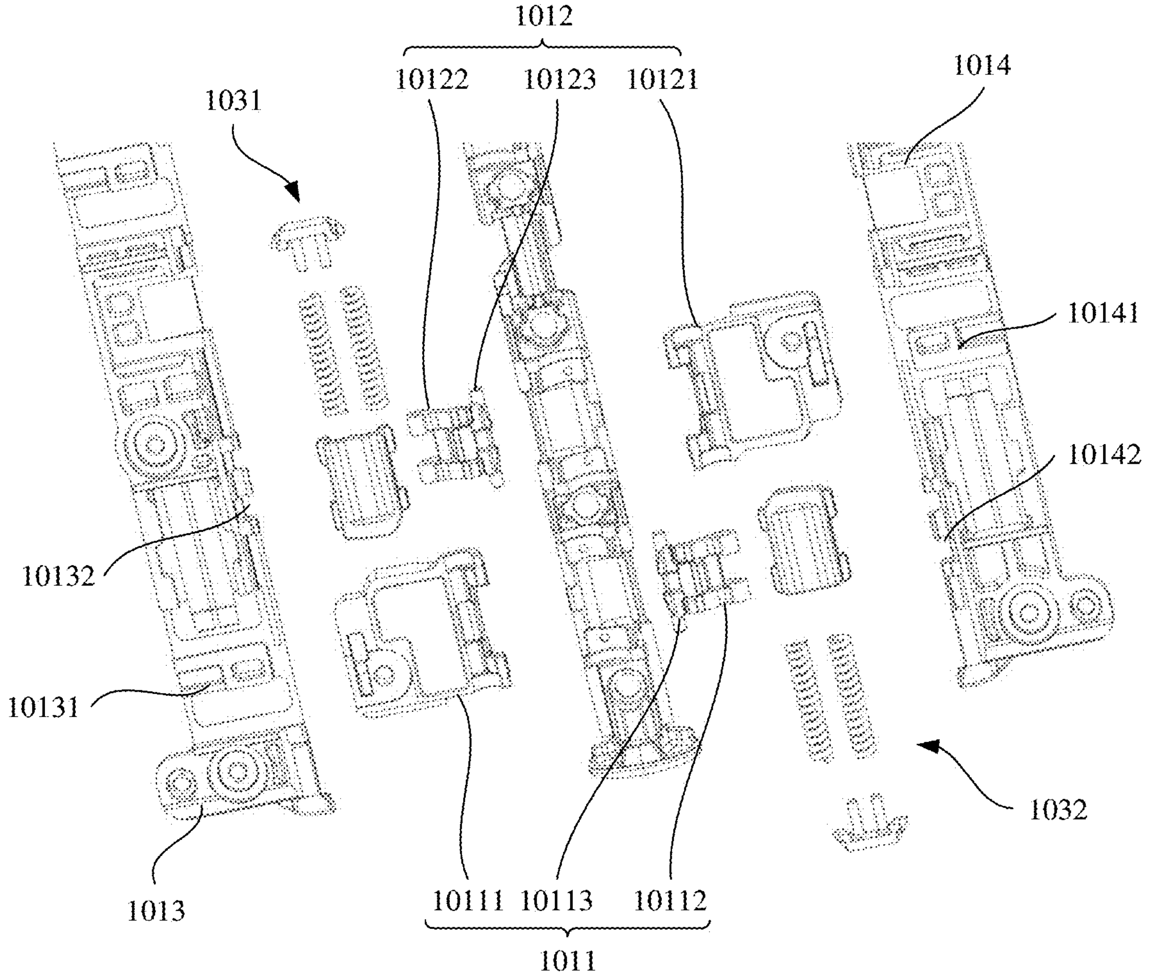
FIG. 4 is an exploded view of the structure shown in FIG. 3.

FIG. 4 is an exploded view of the hinge mechanism 1 shown in FIG. 3. In this application, the rotating module 101 may include a first rotating assembly 1011 and a second rotating assembly 1012. In addition, as shown in FIG. 4, the hinge mechanism 1 may further include a main shaft assembly 102. The main shaft assembly 102 may be used as a bearing component of the first rotating assembly 1011 and the second rotating assembly 1012. The first rotating assembly 1011 and the second rotating assembly 1012 can separately rotate relative to the main shaft assembly.

It should be noted that, in this embodiment of this application, when there are a plurality of rotating modules 101, the first rotating assemblies 1011 and the second rotating assemblies 1012 of the plurality of rotating modules 101 may all use a same main shaft assembly 102 as a bearing component, to improve an integration degree of the hinge mechanism 1. In some other possible embodiments of this application, the hinge mechanism 1 may be provided with one main shaft assembly 102 corresponding to each rotating module 101, so that the first rotating assembly 1011 and the second rotating assembly 1012 of each rotating module 101 use the corresponding main shaft assembly 102 as a bearing component.

In addition, to better implement unfolding and folding of the hinge mechanism 1, the hinge mechanism 1 in this embodiment of this application further provides a damping module that can provide damping force for the foregoing rotating module, so that the first rotating assembly and the second rotating assembly can rotate stably under an action of the damping force, to avoid false unfolding and closing of the electronic device, and implement suspension of the two housings at specified positions. In addition, through disposition of the damping module, a user may further have an obvious operation feeling in a process of unfolding or closing the electronic device. This helps improve user experience.

To present the damping module in this application more clearly and completely, before a specific manner of disposing the damping module in this embodiment of this application is specifically described, refer to a specific implementation of the hinge mechanism shown in FIG. 4 to FIG. 17. In addition to implementing a damping function, the hinge mechanism may further smoothly support the flexible display, and may enable a bendable part of the flexible display to be evenly forced in an intermediate state of the electronic device and in a process of unfolding or folding the electronic device. Further, the hinge mechanism may further keep a length of the flexible display unchanged in the entire process of unfolding or folding the electronic device, thereby ensuring reliability of the flexible display.

The following specifically describes an example design of the hinge mechanism.

Still refer to FIG. 4. In this embodiment of this application, the first rotating assembly 1011 may include a first swing arm 10111, a first support arm 10112, and a first connector 10113. The first connector 10113 is located between the first swing arm 10111 and the first support arm 10112, the first connector 10113 is rotatably connected to the first swing arm 10111, and the first connector 10113 is rotatably connected to the first support arm 10112, so that the first swing arm 10111 and the first support arm 10112 pull each other by using the first connector 10113. In view of this, it may be understood that a movement track of the first connector 10113 plays a key role for a movement track of the first rotating assembly 1011.

Figure 5:
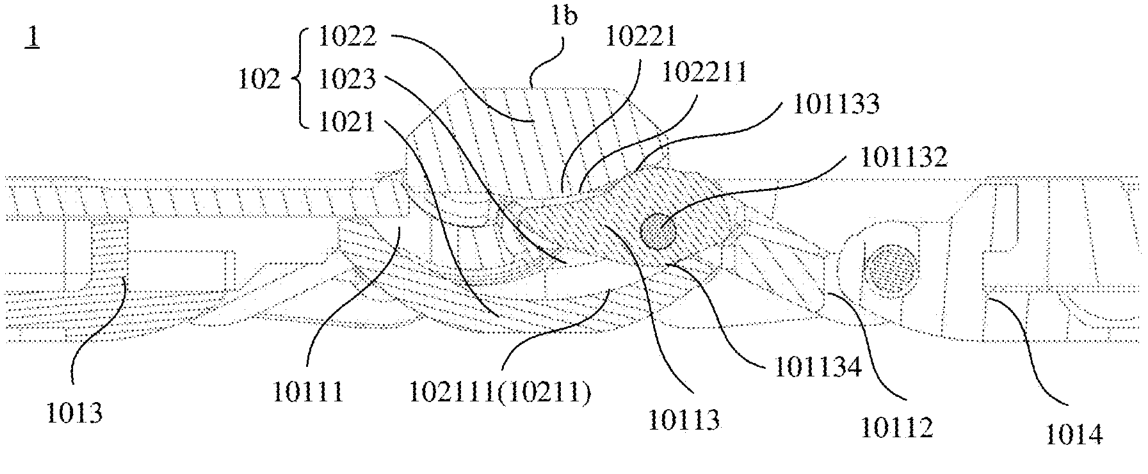
FIG. 5 is a sectional view of a hinge mechanism at a first connector when an electronic device is in an unfolded state according to an embodiment of this application.

In this application, the first connector 10113 may move relative to the main shaft assembly 102. During specific implementation, refer to FIG. 5. FIG. 5 is a sectional view of the hinge mechanism 1 at the first connector 10113 when an electronic device is in an unfolded state according to an embodiment of this application. The main shaft assembly 102 may be provided with a first track slot 1023, and the first connector 10113 may move along the first track slot 1023, so that a movement track of the first connector 10113 may be limited.

Figure 6:
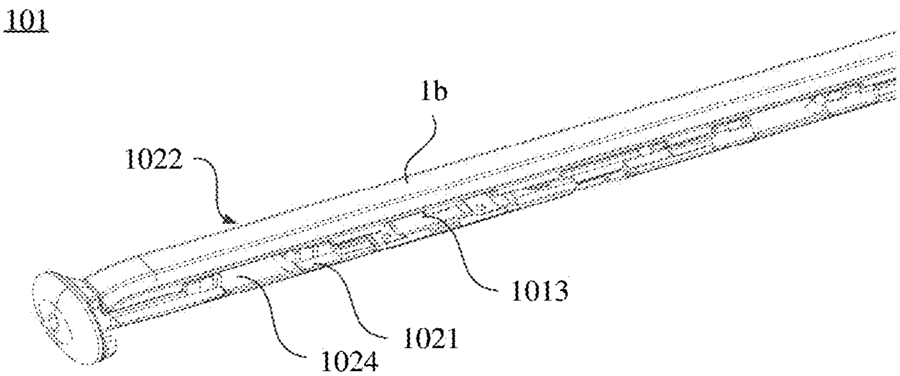
FIG. 6 is a diagram of a structure of a main shaft assembly according to an embodiment of this application.
Figure 7:
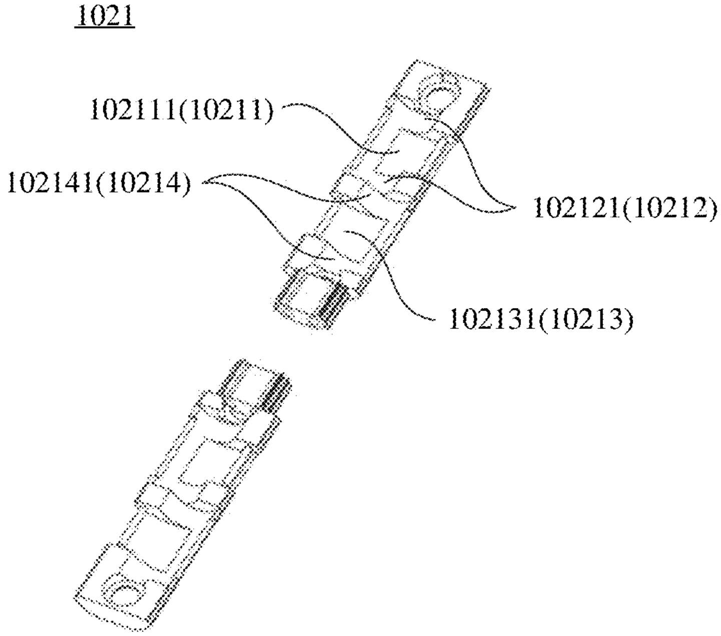
FIG. 7 is a diagram of a structure of a base of the main shaft assembly shown in FIG. 6.
Figure 8:
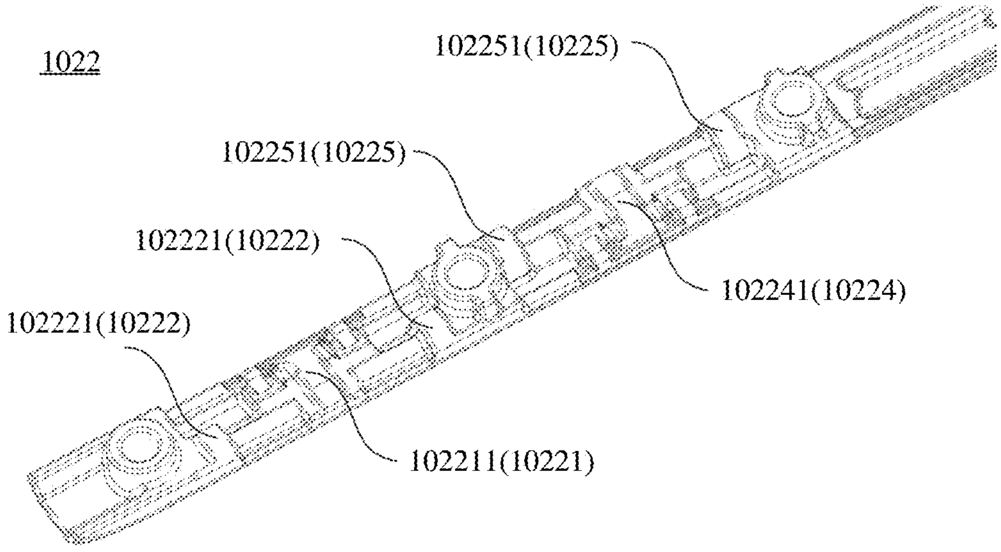
FIG. 8 is a diagram of a structure of a cover plate of the main shaft assembly shown in FIG. 6.

FIG. 6 is a diagram of a structure of the main shaft assembly 102 according to an embodiment of this application. The main shaft assembly 102 may include a base 1021 and a cover plate 1022. The cover plate 1022 covers the base 1021, and an outer surface of the cover plate 1022 may be used as the third appearance surface 1*b* of the hinge mechanism 1. FIG. 7 is a diagram of a structure of the base 1021 of the main shaft assembly 102 shown in FIG. 6. The base 1021 may be provided with a first arc-shaped groove 10211. Refer to FIG. 5 and FIG. 7 together. The first connector 10113 is accommodated in the first arc-shaped groove 10211, and the first connector 10113 may slide along a groove surface 102111 of the first arc-shaped groove. In addition, refer to FIG. 8. FIG. 8 is a diagram of a structure of the cover plate 1022 of the main shaft assembly 102 shown in FIG. 6, and FIG. 8 shows a structure that is of the cover plate 1022 and that faces a side of the base 1021. The cover plate 1022 includes a first protruding part 10221. As shown in FIG. 5, the first protruding part 10221 may be disposed facing the first arc-shaped groove 10211. There is a gap between a surface 102211 of the first protruding part and the groove surface 102111 of the first arc-shaped groove, and the gap is used as the first track slot 1023.

Figure 9:
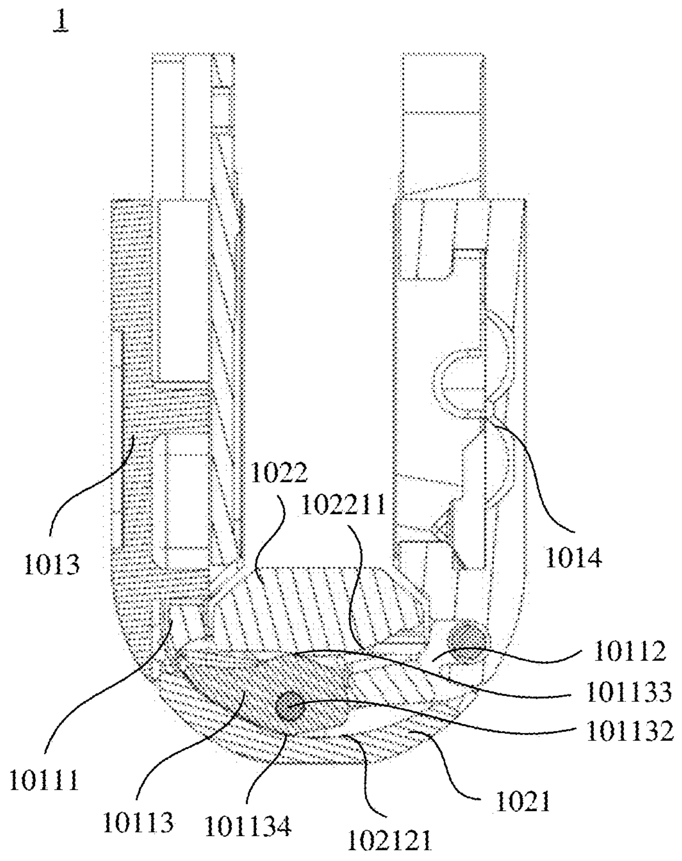
FIG. 9 is a sectional view of a hinge mechanism at a first connector when an electronic device is in a closed state according to an embodiment of this application.

FIG. 9 is a sectional view of the hinge mechanism 1 at the first connector 10113 when an electronic device is in a closed state according to an embodiment of this application. Refer to FIG. 5 and FIG. 9 together. In a process in which the electronic device rotates from an unfolded state to a closed state, the first connector 10113 may move toward the first swing arm 10111 in the first track slot 1023, and in a process in which the electronic device rotates from the closed state to the unfolded state, the first connector 10113 may move toward the first support arm 10112 in the first track slot 1023, so that the first connector 10113 may move relative to the main shaft assembly 102 based on a specified trajectory.

Refer to FIG. 5 and FIG. 9 together. It can be learned that, in the process in which the electronic device rotates from the unfolded state to the closed state or from the closed state to the unfolded state, the first swing arm 10111 and the first support arm 10112 may rotate around the main shaft assembly 102. In addition, because the first swing arm 10111 and the first support arm 10112 pull each other by using the first connector 10113, in a process in which the first connector 10113 moves in the first track slot 1023, the first connector 10113 may further rotate relative to the surface 102211 of the first protruding part and the groove surface 102111 of the first arc-shaped groove, to improve smoothness of motion of the first rotating assembly 1011.

Figure 10:
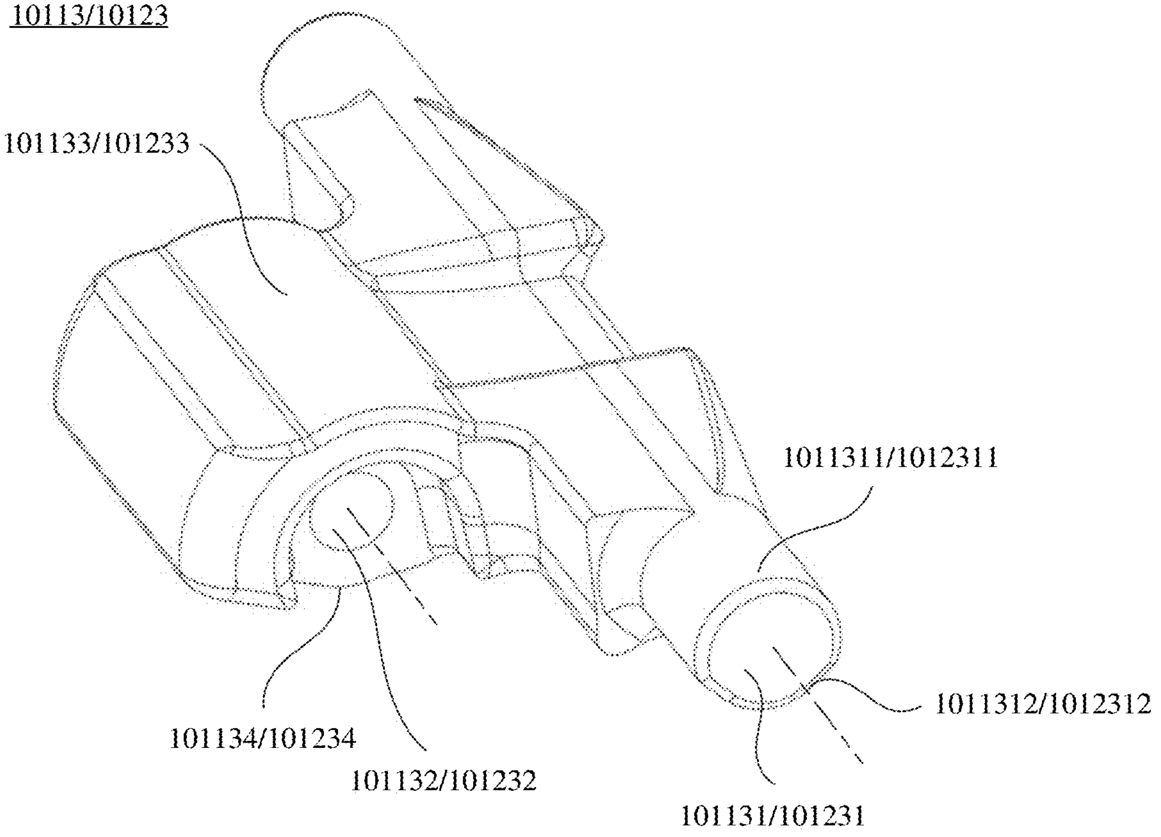
FIG. 10 is a diagram of a structure of a first connector according to an embodiment of this application.

FIG. 10 is a diagram of a structure of the first connector 10113 according to an embodiment of this application. In this application, the first connector 10113 may include a first arc-shaped surface 101133 and a second arc-shaped surface 101134. To implement rotation of the first connector 10113 relative to the surface 102211 of the first protruding part and the groove surface 102111 of the first arc-shaped groove, the first arc-shaped surface 101133 and the second arc-shaped surface 101134 may be circular arc-shaped surfaces, and a circle center of the first arc-shaped surface 101133 coincides with a circle center of the second arc-shaped surface 101134. Radii of the first arc-shaped surface 101133 and the second arc-shaped surface 101134 may be equal or unequal, and this is not limited in this application. In addition, in consideration of design tolerance, the first arc-shaped surface 101133 and the second arc-shaped surface 101134 may alternatively be arc-shaped surfaces of other possible forms such as an elliptical arc-shaped surface, provided that the first connector 10113 can rotate relative to the surface 102211 of the first protruding part and the groove surface 102111 of the first arc-shaped groove.

Still refer to FIG. 5 and FIG. 9. When the electronic device is in the unfolded state shown in FIG. 5 and the closed state shown in FIG. 9, the first arc-shaped surface 101133 of the first connector 10113 may abut against the surface 102211 of the first protruding part, and the second arc-shaped surface 101134 abuts against the groove surface 102111 of the first arc-shaped groove. In this way, the surface 102211 of the first protruding part and the groove surface 102111 of the first arc-shaped groove limit the first connector 10113 to the first track slot 1023, so that when the hinge mechanism 1 is in the unfolded state and the closed state, the first connector 10113 has a stable position, and does not shake due to a gap. Therefore, reliability of the hinge mechanism 1 in the foregoing two states is improved.

In this application, when the electronic device is in the unfolded state shown in FIG. 5, a distance between a point at which the surface 102211 of the first protruding part abuts against the first arc-shaped surface 101133 and a point at which the groove surface 102111 of the first arc-shaped groove abuts against the second arc-shaped surface 101134 may be denoted as d1. When the electronic device is in the closed state shown in FIG. 9, a distance between a point at which the surface 102211 of the first protruding part abuts against the first arc-shaped surface 101133 and a point at which the groove surface 102111 of the first arc-shaped groove abuts against the second arc-shaped surface 101134 may be denoted as d2. When the electronic device is in the unfolded state and the closed state, the first arc-shaped surface 101133 of the first connector 10113 may abut against the surface 102211 of the first protruding part, and the second arc-shaped surface 101134 abuts against the groove surface 102111 of the first arc-shaped groove. In this case, when both the first arc-shaped surface 101133 and the second arc-shaped surface 101134 are circular arc-shaped surfaces, d1=d2 may be obtained.

In this application, specific disposition forms of the surface 102211 of the first protruding part and the groove surface 102111 of the first arc-shaped groove are not limited. For example, the surface 102211 of the first protruding part may be a circular arc-shaped surface, and the groove surface 102111 of the first arc-shaped groove may be a circular arc-shaped surface. In addition, a circle center of the surface 102211 of the first protruding part coincides with a circle center of the groove surface 102111 of the first arc-shaped groove. In some other possible embodiments of this application, both the surface 102211 of the first protruding part and the groove surface 102111 of the first arc-shaped groove may be disposed as planes, so that the first track slot 1023 is a linear slot. Alternatively, the surface 102211 of the first protruding part and the groove surface 102111 of the first arc-shaped groove may be curved surfaces in other forms, so that the first track slot 1023 is a curved slot in any form. Both the two cases should be understood as falling within the protection scope of this application.

Still refer to FIG. 5. In this application, the surface 102211 of the first protruding part may be equidistant from the groove surface 102111 of the first arc-shaped groove, and the first track slot 1023 is an equal-width slot. In this case, in the process in which the electronic device rotates from the unfolded state to the closed state and in the process in which the electronic device rotates from the closed state to the unfolded state, the surface 102211 of the first protruding part, the first arc-shaped surface 101133, the groove surface 102111 of the first arc-shaped groove, and the second arc-shaped surface 101134 are always in a state of abutting against each other, so that a movement track of the first connector 10113 may be the same in the process in which the electronic device rotates from the unfolded state to the closed state and in the process in which the electronic device rotates from the closed state to the unfolded state. This can help improve motion stability of the first connector 10113, and improves motion stability of the first rotating assembly 1011.

Figure 11:
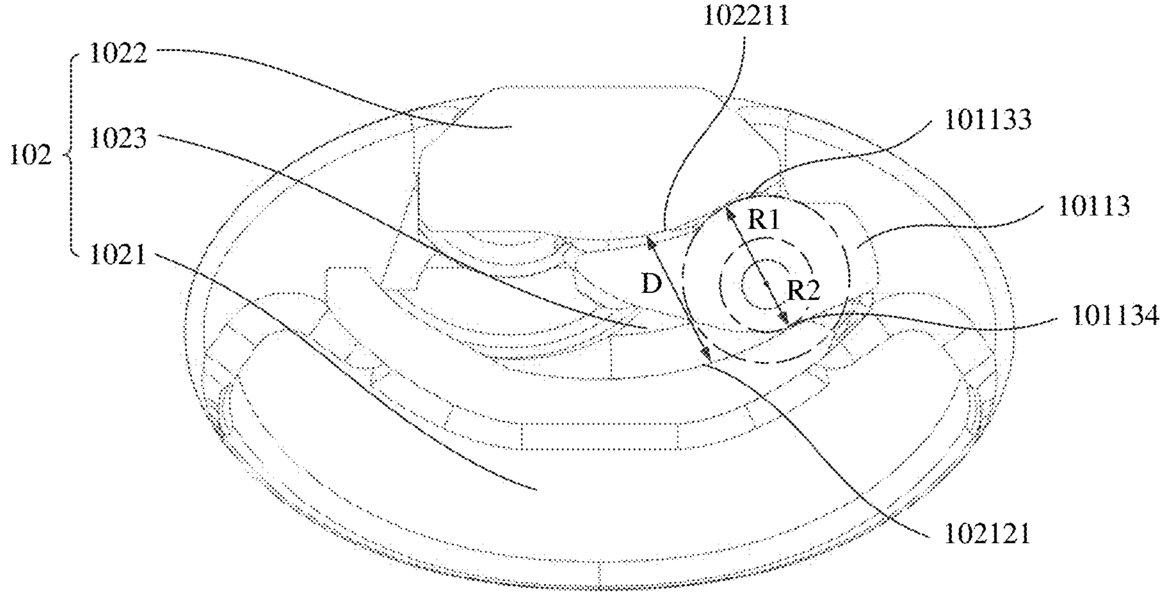
FIG. 11 is a diagram of an assembly structure of a first connector and a main shaft assembly according to an embodiment of this application.

FIG. 11 is a diagram of an assembly structure of the first connector 10113 and the main shaft assembly 102 according to an embodiment of this application. In this application, when the first track slot 1023 is an equal-width slot, and the first arc-shaped surface 101133 and the second arc-shaped surface 101134 are circular arc-shaped surfaces, a sum of a radius R1 of the first arc-shaped surface 101133 and a radius R2 of the second arc-shaped surface 101134 is equal to a distance D between the surface 102211 of the first protruding part and the groove surface 102111 of the first arc-shaped groove. In addition, considering smoothness of motion of the first connector 10113 in the first track slot 1023, a specific design gap may be reserved between the first arc-shaped surface 101133 and the surface 102211 of the first protruding part, and/or between the second arc-shaped surface 101134 and the groove surface 102111 of the first arc-shaped groove.

In some other possible embodiments of this application, a movement track of the first connector 10113 in the process in which the electronic device rotates from the unfolded state to the closed state may alternatively be different from a movement track of the first connector 10113 in a process in which electronic device rotates from the closed state to the unfolded state. During specific implementation, in the process in which the electronic device rotates from the unfolded state to the closed state, the first arc-shaped surface 101133 abuts against the surface 102211 of the first protruding part, and there is a gap between the second arc-shaped surface 101134 and the groove surface 102111 of the first arc-shaped groove. In addition, in the process in which the electronic device rotates from the unfolded state to the closed state, the second arc-shaped surface 101134 abuts against the groove surface 102111 of the first arc-shaped groove, and there is a gap between the first arc-shaped surface 101133 and the surface 102211 of the first protruding part. In this embodiment, gaps between positions on the surface 102211 of the first protruding part and positions on the groove surface

102111 of the first arc-shaped groove may be unequal, and the first track slot 1023 may be a non-equal-width slot.

It can be learned from the foregoing descriptions that, in this application, the first swing arm 10111 may be rotatably connected to the main shaft assembly 102, and the first swing arm 10111 may be rotatably connected to the main shaft assembly 102 through a virtual axis. This can help reduce space occupied by the first swing arm 10111 on the main shaft assembly 102, and can help reduce a size of the rotating module 101 to implement a miniaturization design of the hinge mechanism 1. In addition, it may be understood that, for an outward-foldable electronic device, when the first swing arm 10111 is rotatably connected to the main shaft assembly 102 through a virtual axis, an axis center through which the first swing arm 10111 rotates around the main shaft assembly 102 is located on a side that is of the main shaft assembly 102 and that is away from the flexible display.

Figure 12:
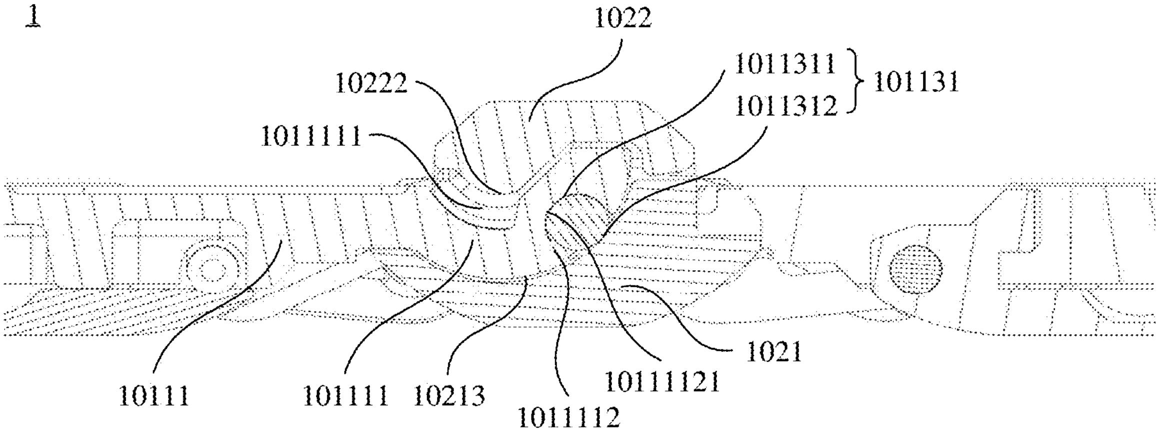
FIG. 12 is an A-A sectional view of the structure shown in FIG. 3.

It should be noted that, in this application, the virtual axis is an axis center of a circular arc-shaped structure. Two parts that are rotatably connected may rotate relative to the virtual axis, and a position of the virtual axis is fixed as the two parts that are rotatably connected rotate relative to each other. For example, FIG. 12 is an A-A sectional view of the structure shown in FIG. 3. An end that is of the first swing arm 10111 and that faces the base 1021 may be provided with a first arc-shaped rotating block 101111. In addition, refer to FIG. 7. The base 1021 may be provided with a second arc-shaped groove 10212. In this case, the first arc-shaped rotating block 101111 may be accommodated in the second arc-shaped groove 10212, and the first arc-shaped rotating block 101111 may slide along a groove surface of the second arc-shaped groove 10212, so that the first swing arm 10111 rotates around the main shaft assembly 102 by sliding the first arc-shaped rotating block 101111 along the arc-shaped surface of the second arc-shaped groove 10212. In addition, in this application, the first arc-shaped rotating block 101111 may be, but is not limited to, a circular arc-shaped rotating block, and the second arc-shaped groove 10212 may be, but is not limited to, a circular arc-shaped groove. It may be understood that, when the first arc-shaped rotating block 101111 is a circular arc-shaped rotating block, a surface that is of the first arc-shaped rotating block 101111 and that is in contact with the groove surface of the second arc-shaped groove 10212 may be a circular arc-shaped surface, the groove surface of the second arc-shaped groove 10212 is also a circular arc-shaped surface, and circle centers of the two circular arc-shaped surfaces coincide with each other.

Refer to FIG. 8 and FIG. 12 together. The cover plate 1022 may include a second protruding part 10222 disposed facing the second arc-shaped groove 10212, at least a part of the first arc-shaped rotating block 101111 is located between the second protruding part 10222 and the second arc-shaped groove 10212, and the first arc-shaped rotating block 101111 may be in contact with a surface 102221 of the second protruding part. In this way, the first arc-shaped rotating block 101111 may be limited between the cover plate 1022 and the base 1021. This can effectively improve stability of rotation of the first arc-shaped rotating block 101111 relative to the base 1021.

It should be noted that when the groove surface of the second arc-shaped groove 10212 is a circular arc-shaped surface, a part that is in the surface 102221 of the second protruding part and that is configured to be in contact with the first arc-shaped rotating block 101111 may also be a circular arc-shaped surface, and circle centers of the two circular arc-shaped surfaces coincide with each other. In addition, a surface that is of the first arc-shaped rotating block 101111 and that faces the second protruding part 10222 may be a plane or may be a circular arc-shaped surface, provided that the first arc-shaped rotating block 101111 can rotate relative to the second protruding part 10222.

Figure 13:
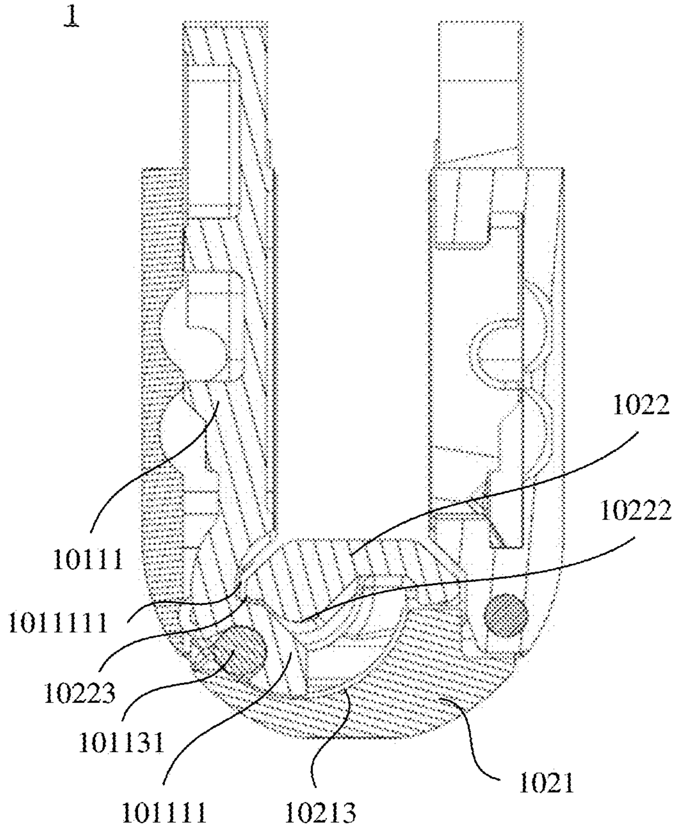
FIG. 13 is a sectional view of a hinge mechanism at a first swing arm when an electronic device is in a closed state according to an embodiment of this application.

FIG. 13 is a sectional view of the hinge mechanism 1 at the first swing arm 10111 when an electronic device is in a closed state according to an embodiment of this application. In this application, the first arc-shaped rotating block 101111 may be further provided with a first concave part 1011111, and an opening of the first concave part 1011111 is disposed facing the cover plate 1022. In addition, an end part that is of the cover plate 1022 and that faces the first swing arm 10111 may be provided with a first plug part 10223. In this case, in the closed state, the first plug part 10223 may be plugged in the first concave part 1011111, and a surface that is of the first plug part 10223 and that faces the second arc-shaped groove 10212 abuts against at least a part of a surface of the first concave part 1011111. In this way, a rotation position of the first arc-shaped rotating block 101111 may be limited, and the first arc-shaped rotating block 101111 may be prevented from falling off from the second arc-shaped groove 10212. Therefore, reliability of a connection between the first swing arm 10111 and the base 1021 can be improved, and structural reliability of the entire hinge mechanism 1 can be improved.

It should be noted that, in this application, in addition to being rotatably connected to the main shaft assembly 102 through a virtual axis, the first swing arm 10111 may alternatively be rotatably connected to the main shaft assembly 102 through a solid axis, so that a connection between the first swing arm 10111 and the main shaft assembly 102 is reliable. It may be understood that, when the first swing arm 10111 is rotatably connected to the main shaft assembly 102 through a solid axis, an axis center through which the first swing arm 10111 rotates around the main shaft assembly 102 is located on a side that is of the main shaft assembly 102 and that is away from the flexible display.

In this application, when the first swing arm 10111 is rotatably connected to the first connector 10113, still refer to FIG. 10. The first connector 10113 may include a first rotating shaft 101131 and a second rotating shaft 101132, and an axis of the first rotating shaft 101131 and an axis of the second rotating shaft 101132 are parallel to each other, but do not coincide with each other.

Figure 14:
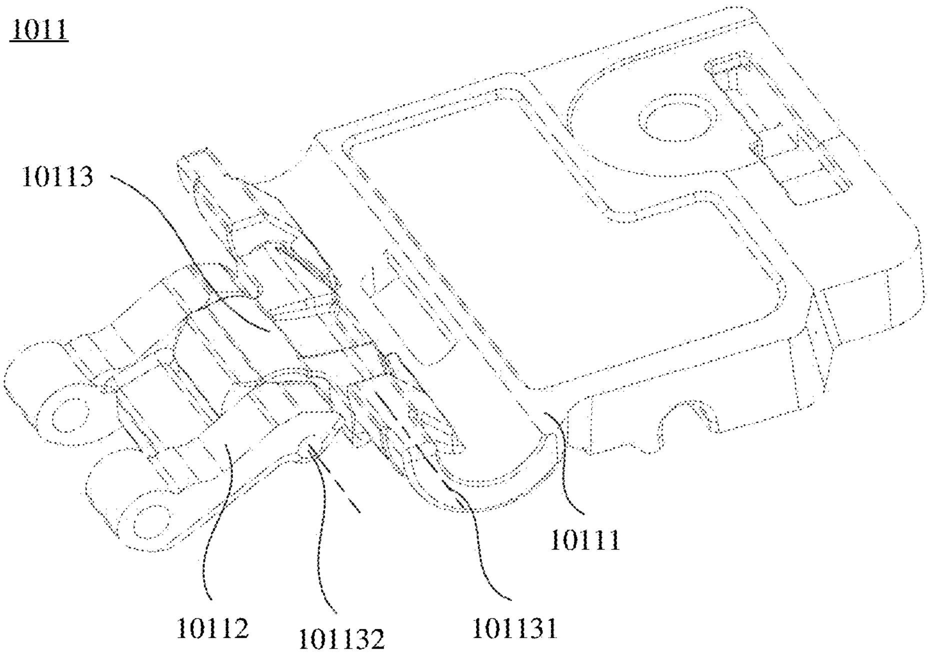
FIG. 14 is a diagram of a structure of a first rotating assembly according to an embodiment of this application.

In addition, FIG. 14 is a diagram of a structure of the first rotating assembly 1011 according to an embodiment of this application. The first connector 10113 is rotatably connected to the first swing arm 10111 through the first rotating shaft 101131, and the first connector 10113 is rotatably connected to the first support arm 10112 through the second rotating shaft 101132. In this way, the first swing arm 10111 and the first support arm 10112 pull each other by using the first connector 10113.

Figure 15:
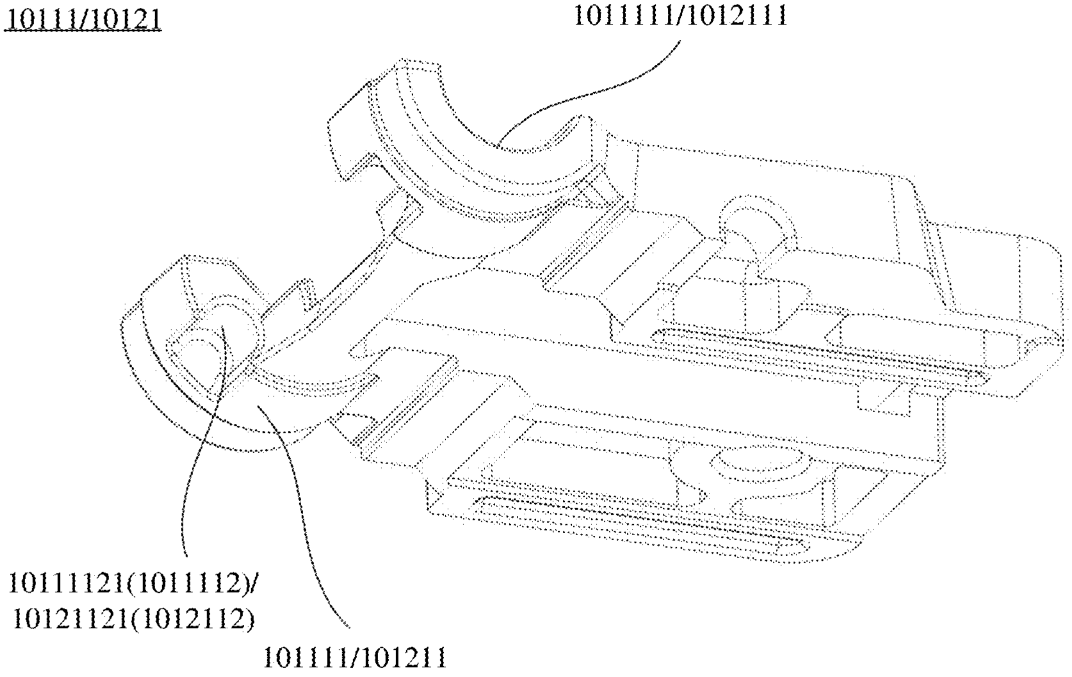
FIG. 15 is a diagram of a structure of a first swing arm according to an embodiment of this application.

FIG. 15 is a diagram of a structure of the first swing arm 10111 according to an embodiment of this application. The first arc-shaped rotating block 101111 of the first swing arm 10111 is provided with a first mounting slot 1011112. Refer to FIG. 12 and FIG. 15 together. A slot opening of the first mounting slot 1011112 is disposed facing the second arc-shaped groove 10212. In this case, the first rotating shaft 101131 may be mounted in the first mounting slot 1011112, a part of the surface of the first rotating shaft 101131 may be in contact with a slot surface of the first mounting slot 1011112, and a part of the surface of the first rotating shaft

101131 is in contact with the groove surface of the second arc-shaped groove 10212, to limit the first rotating shaft 101131 to the first mounting slot 1011112.

Still refer to FIG. 12 and FIG. 15. The slot surface of the first mounting slot 1011112 may include a first circular arc-shaped surface 10111121, a surface that is of the first rotating shaft 101131 and that is configured to be in contact with the slot surface of the first mounting slot 1011112 is a second circular arc-shaped surface 1011311, and a circle center of the first circular arc-shaped surface 10111121 coincides with a circle center of the second circular arc-shaped surface 1011311. In addition, refer to FIG. 7. The groove surface of the second arc-shaped groove 10212 may be a third circular arc-shaped surface 102121. However, as shown in FIG. 12, a surface that is of the first rotating shaft 101131 and that is configured to be in contact with the groove surface of the second arc-shaped groove 10212 may be a fourth circular arc-shaped surface 1011312, and a circle center of the third circular arc-shaped surface 102121 coincides with a circle center of the fourth circular arc-shaped surface 1011312. In this way, refer to FIG. 12 and FIG. 13 together. When the first rotating shaft 101131 slides along the groove surface of the second arc-shaped groove 10212 with the first arc-shaped rotating block 101111, the first rotating shaft 101131 may further rotate relative to the first arc-shaped rotating block 101111, to facilitate motion of the first connector 10113 relative to the main shaft assembly 102.

In this application, when the first connector 10113 is rotatably connected to the first support arm 10112, as shown in FIG. 14, the second rotating shaft 101132 may penetrate both the first connector 10113 and the first support arm 10112. In this case, a connection manner between the first connector 10113 and the first support arm 10112 is simple. This helps simplify a structure of the first rotating assembly 1011, and simplifies a structure of the hinge mechanism 1. It should be noted that when the first arc-shaped surface 101133 and the second arc-shaped surface 101134 of the first connector 10113 are both circular arc-shaped surfaces, a circle center of the first arc-shaped surface 101133, a circle center of the second arc-shaped surface 101134, and an axis center of the second rotating shaft 101132 coincide with each other.

It may be understood that, in the hinge mechanism 1 provided in this embodiment of this application, the first connector 10113 may include a plurality of first sub connectors that are rotatably connected in sequence. In addition, the plurality of first sub connectors may be located between the first swing arm 10111 and the first support arm 10112. In this case, the first swing arm 10111 may be rotatably connected to an adjacent first sub connector, and the first support arm 10112 may be rotatably connected to an adjacent first sub connector. For a manner of rotatably connecting the first swing arm 10111 to the adjacent first sub connector and a manner of rotatably connecting the first support arm 10112 to the adjacent first sub connector, refer to the foregoing descriptions of the rotatable connections between the first swing arm 10111, and the first support arm 10112 and the first connector 10113. Details are not described herein again. In this application, the first connector 10113 is disposed as a plurality of first sub connectors that are rotatably connected in sequence, so that the first swing arm 10111 and the first support arm 10112 are connected by using the plurality of first sub connectors. This can effectively improve speed uniformity in a process in which the first swing arm 10111 and the first support arm 10112 rotate around the main shaft assembly 102, so as to improve smoothness of mutual pulling between the first swing arm 10111 and the first support arm 10112.

Still refer to FIG. 4. In this embodiment of this application, the hinge mechanism 1 may further include a first housing fastening bracket 1013 and a second housing fastening bracket 1014, and the first housing fastening bracket 1013 and the second housing fastening bracket 1014 are respectively disposed on two opposite sides of the main shaft assembly 102, and the first rotating assembly 1011 is located between the first housing fastening bracket 1013 and the second housing fastening bracket 1014. The first swing arm 10111 is slidably connected to the first housing fastening bracket 1013. During specific implementation, the first housing fastening bracket 1013 is provided with a first sliding slot 10131. The first sliding slot 10131 extends in a first direction, and the first swing arm 10111 may be mounted in the first sliding slot 10131, and may slide in the first sliding slot 10131 in the first direction. The first direction may be a direction in which the first housing fastening bracket 1013 moves toward or away from the base 1021. In addition, to prevent the first swing arm 10111 from falling off from the first sliding slot 10131, a first sliding rail may be disposed on a slot wall of the first sliding slot 10131, and a first sliding block may be disposed on the first swing arm 10111. In this way, the first sliding block may be fastened on the first sliding rail, and the first sliding block may slide along the first sliding rail, to limit the first swing arm 10111 in the first sliding slot 10131. In addition, the first sliding rail is disposed on the slot wall of the first sliding slot 10131 to provide guide for sliding of the first swing arm 10111 along the first sliding slot 10131, so that motion stability of the first swing arm 10111 is improved.

In this application, the first support arm 10112 may be rotatably connected to the second housing fastening bracket 1014. During specific implementation, still refer to FIG. 4. The second housing fastening bracket 1014 has a second mounting part 10142. An end part that is of the first support arm 10112 and that faces the second housing fastening bracket 1014 is mounted on the second mounting part 10142, and an end part that is of the first support arm 10112 and that faces the second housing fastening bracket 1014 is rotatably connected to the second mounting part 10142.

In this embodiment of this application, a specific manner in which the end part that is of the first support arm 10112 and that faces the second housing fastening bracket 1014 is rotatably connected to the second mounting part 10142 is not limited. For example, still refer to FIG. 4. The second mounting part 10142 may be provided with a first mounting hole, and an end part that is of the first support arm 10112 and that faces the second housing fastening bracket 1014 is provided with a second mounting hole. In this case, the end part that is of the first support arm 10112 and that faces the first housing fastening bracket 1013 may be rotatably connected to the second mounting part 10142 through a rotating shaft that penetrates both the first mounting hole and the second mounting hole.

Still refer to FIG. 4. A structure of the second rotating assembly 1012 is similar to that of the first rotating assembly 1011. When the second rotating assembly 1012 is specifically disposed, the second rotating assembly 1012 is located between the first housing fastening bracket 1013 and the second housing fastening bracket 1014. In addition, the second rotating assembly 1012 may include a second swing arm 10121, a second support arm 10122, and a second connector 10123. The second connector 10123 is located between the second swing arm 10121 and the second support arm 10122, the second connector 10123 is rotatably connected to the second swing arm 10121, and the second connector 10123 is rotatably connected to the second support arm 10122. In this application, when the second connector 10123 is rotatably connected to the second swing arm 10121 and the first support arm 10112, the second connector 10123, the second swing arm 10121, and the first support arm 10112 may be disposed with reference to the foregoing manner in which the first connector 10113 is rotatably connected to the second swing arm 10121 and the second support arm 10122. For example, FIG. 10 may also be used to indicate a structure of the second connector 10123 according to this embodiment of this application. The second connector 10123 may include a third rotating shaft 101231 and a fourth rotating shaft 101232, and an axis of the third rotating shaft 101231 and an axis of the fourth rotating shaft 101232 are parallel to each other, but do not coincide with each other. The second connector 10123 may be rotatably connected to the second swing arm 10121 by using the third rotating shaft 101231, and the second connector 10123 is rotatably connected to the second support arm 10122 by using the fourth rotating shaft 101232, so that the second swing arm 10121 and the second support arm 10122 pull each other by using the second connector 10123.

In addition, refer to FIG. 6. The main shaft assembly 102 may be provided with a second track slot 1024, and the second connector 10123 may move along the second track slot, so that a movement track of the second connector 10123 may be limited. During specific implementation, refer to FIG. 7. The base 1021 may be provided with a third arc-shaped groove 10213, the second connector 10123 is accommodated in the third arc-shaped groove 10213, and the second connector 10123 may slide along a groove surface of the third arc-shaped groove 10213. In addition, refer to FIG. 8. The cover plate 1022 includes a third protruding part 10224. The third protruding part 10224 may be disposed facing the third arc-shaped groove 10213 of the base 1021 in FIG. 7. There is a gap between a surface 102241 of the third protruding part and a groove surface 102131 of the third arc-shaped groove, and the gap is used as the second track slot 1024.

In this application, as shown in FIG. 10, the second connector 10123 may include a third arc-shaped surface 101233 and a fourth arc-shaped surface 101234. When the electronic device is in an unfolded state and a closed state, the third arc-shaped surface 101233 of the second connector 10123 may abut against the surface 102241 of the third protruding part, and the fourth arc-shaped surface 101234 abuts against the groove surface 102131 of the third arc-shaped groove. In this way, the surface 102241 of the third protruding part and the groove surface 102131 of the third arc-shaped groove limit the second connector 10123 to the second track slot 1024, so that when the hinge mechanism 1 is in an unfolded state and a closed state, the second connector 10123 has a stable position, and does not shake due to a gap. Therefore, structural reliability of the hinge mechanism 1 in the foregoing two states is improved.

In this embodiment of this application, the third arc-shaped surface 101233 of the second connector 10123 may be disposed with reference to the first arc-shaped surface 101133 of the first connector 10113, and the fourth arc-shaped surface 101234 may be disposed with reference to the second arc-shaped surface 101134 of the first connector 10113. Details are not described herein again. In addition, the second track slot 1024 may be specifically provided with reference to the first track slot 1023. Simply, the surface 102241 of the third protruding part is equidistant from the groove surface 102131 of the third arc-shaped groove, so that the second track slot 1024 is an equal-width slot. In this case, in a process in which the electronic device rotates from the unfolded state to the closed state and in a process in which the electronic device rotates from the closed state to the unfolded state, the surface 102241 of the third protruding part, the third arc-shaped surface 101233, the groove surface 102131 of the third arc-shaped groove, and the fourth arc-shaped surface 101234 are always in a state of abutting against each other. Therefore, in the process in which the electronic device rotates from the unfolded state to the closed state and in the process in which the electronic device rotates from the closed state to the unfolded state, a movement track of the second connector 10123 in the second track slot 1024 is the same. Alternatively, in the process in which the electronic device rotates from the unfolded state to the closed state, the third arc-shaped surface 101233 abuts against the surface 102241 of the third protruding part, and there is a gap between the fourth arc-shaped surface 101234 and the groove surface 102131 of the third arc-shaped groove. In the process in which the electronic device rotates from the closed state to the unfolded state, the fourth arc-shaped surface 101234 abuts against the groove surface 102131 of the third arc-shaped groove, and there is a gap between the third arc-shaped surface 101233 and the surface 102241 of the third protruding part. In this way, a movement track of the second connector 10123 in the process in which the electronic device rotates from the unfolded state to the closed state is different from a movement track of the second connector 10123 in the process in which the electronic device rotates from the closed state to the unfolded state.

In this application, the second swing arm 10121 is rotatably connected to the main shaft assembly 102. The second swing arm 10121 may be rotatably connected to the main shaft assembly 102 through a virtual axis. During specific implementation, as shown in FIG. 7, the base 1021 may be provided with a fourth arc-shaped groove 10214. In addition, refer to FIG. 4 and FIG. 15 together. FIG. 15 may also be used to show a structure of the second swing arm 10121. An end that is of the second swing arm 10121 and that faces the base 1021 is provided with a second arc-shaped rotating block 101211, where the second arc-shaped rotating block 101211 may be but is not limited to a circular arc-shaped rotating block, and the fourth arc-shaped groove 10214 may be but is not limited to a circular arc-shaped groove. In this case, the second arc-shaped rotating block 101211 may be accommodated in the fourth arc-shaped groove 10214, and may slide along a groove surface of the fourth arc-shaped groove 10214, so that the second swing arm 10121 rotates around the base 1021 by sliding the second arc-shaped rotating block 101211 along the groove surface of the fourth arc-shaped groove 10214. In this way, space occupied by the second swing arm 10121 on the main shaft assembly 102 can be reduced. This helps reduce a size of the rotating module 101, and helps implement a miniaturization design of the hinge mechanism 1. It may be understood that, for an outward-foldable electronic device, when the second swing arm 10121 is rotatably connected to the main shaft assembly 102 through a virtual axis, an axis center through which the second swing arm 10121 rotates around the main shaft assembly 102 is located on a side that is of the hinge mechanism and that is away from the flexible display.

In addition, in this application, the second arc-shaped rotating block 101211 may be, but is not limited to, a circular arc-shaped rotating block, and the fourth arc-shaped groove 10214 may be, but is not limited to, a circular arc-shaped groove. It may be understood that, when the second arc-shaped rotating block 101211 is a circular arc-shaped rotating block, a surface that is of the second arc-shaped rotating block 101211 and that is in contact with the groove surface of the fourth arc-shaped groove 10214 may be a circular arc-shaped surface, the groove surface of the fourth arc-shaped groove 10214 is also a circular arc-shaped surface, and circle centers of the two circular arc-shaped surfaces coincide with each other.

In this application, to improve stability of rotation of the second swing arm 10121 around the main shaft assembly 102, as shown in FIG. 8, the cover plate 1022 further includes a fourth protruding part 10225 disposed facing the fourth arc-shaped groove 10214. At least a part of the second arc-shaped rotating block 101211 is located between the fourth protruding part 10225 and the fourth arc-shaped groove 10214, and a surface that is of the second arc-shaped rotating block 101211 and that faces the fourth protruding part 10225 may be in contact with a surface 102251 of the fourth protruding part. In this way, the second arc-shaped rotating block 101211 may be limited between the cover plate 1022 and the base 1021. This can effectively improve stability of rotation of the second arc-shaped rotating block 101211 relative to the base 1021. In addition, when the groove surface of the fourth arc-shaped groove 10214 is a circular arc-shaped surface, a part that is in the surface 102251 of the fourth protruding part and that is configured to be in contact with the second arc-shaped rotating block 101211 may also be a circular arc-shaped surface, and circle centers of the two circular arc-shaped surfaces coincide with each other. In this application, a surface that is of the second arc-shaped rotating block 101211 and that faces the fourth protruding part 10225 may be a plane or may be a circular arc-shaped surface, provided that the second arc-shaped rotating block 101211 can rotate relative to the fourth protruding part 10225 in a process of sliding along the groove surface of the fourth arc-shaped groove 10214.

To improve reliability of a connection between the second swing arm 10121 and the base 1021, the second arc-shaped rotating block 101211 may further be provided with a second concave part 1012111, and an opening of the second concave part 1012111 is disposed facing the cover plate 1022. In addition, an end part that is of the cover plate 1022 and that faces the second housing fastening bracket 1014 may be provided with a second plug part. In this case, in the closed state, the second plug part may be plugged in the second concave part 1012111, and a surface that is of the second plug part and that faces the fourth arc-shaped groove 10214 abuts against at least a part of a surface of the second concave part 1012111. In this way, a rotation position of the second arc-shaped rotating block 101211 may be limited, to prevent the second arc-shaped rotating block 101211 from falling off from the fourth arc-shaped groove 10214.

It should be noted that, in this application, in addition to being rotatably connected to the main shaft assembly 102 through a virtual axis, the second swing arm 10121 may alternatively be rotatably connected to the main shaft assembly 102 through a solid axis, so that a connection between the first swing arm 10111 and the main shaft assembly 102 is reliable. For an outward-foldable electronic device, when the second swing arm 10121 is rotatably connected to the main shaft assembly 102 through a solid axis, an axis center through which the second swing arm 10121 rotates around the main shaft assembly 102 is located on a side that is of the hinge mechanism and that is away from the flexible display.

Specifically, when the second connector 10123 is rotatably connected to the second swing arm 10121 by using the third rotating shaft 101231, still refer to FIG. 15. The second arc-shaped rotating block 101211 is provided with a second mounting slot 1012112, and a slot opening of the second mounting slot 1012112 is disposed facing the fourth arc-shaped groove 10214. In this case, the third rotating shaft 101231 may be mounted in the second mounting slot 1012112, a part of a surface of the third rotating shaft 101231 may be in contact with a slot surface of the second mounting slot 1012112, and a part of a surface of the third rotating shaft 101231 is in contact with a groove surface of the fourth arc-shaped groove 10214, so that the third rotating shaft 101231 is limited to the second mounting slot 1012112.

As shown in FIG. 15, in this application, the slot surface of the second mounting slot 1012112 may include a fifth circular arc-shaped surface 10121121. As shown in FIG. 10, a surface that is of the third rotating shaft 101231 and that is configured to be in contact with the slot surface of the second mounting slot 1012112 is a sixth circular arc-shaped surface 1012311, and a circle center of the fifth circular arc-shaped surface 10121121 coincides with a circle center of the sixth circular arc-shaped surface 1012311. In addition, the groove surface of the fourth arc-shaped groove 10214 is a seventh circular arc-shaped surface 102141, and a surface that is of the third rotating shaft 101231 and that is configured to be in contact with the groove surface of the fourth arc-shaped groove 10214 may be an eighth circular arc-shaped surface 1012312. In this case, a circle center of the seventh circular arc-shaped surface 102141 coincides with a circle center of the eighth circular arc-shaped surface 1012312. In this way, when the third rotating shaft 101231 slides along the groove surface of the fourth arc-shaped groove 10214 with the second arc-shaped rotating block 101211, the third rotating shaft 101231 may further rotate relative to the second arc-shaped rotating block 101211, to facilitate motion of the second connector 10123 relative to the main shaft assembly 102.

In this embodiment of this application, specifically, when the second connector 10123 is rotatably connected to the second support arm 10122 by using the fourth rotating shaft 101232, the fourth rotating shaft 101232 may penetrate both the second connector 10123 and the second support arm 10122. In this case, a connection manner between the second connector 10123 and the second support arm 10122 is simple. This helps simplify a structure of the second rotating assembly 1012, and simplifies a structure of the hinge mechanism 1.

It may be understood that, in the hinge mechanism 1 provided in this embodiment of this application, the second connector 10123 may include a plurality of second sub connectors that are rotatably connected in sequence. In addition, the plurality of second sub connectors may be located between the second swing arm 10121 and the second support arm 10122. In this case, the second swing arm 10121 may be rotatably connected to an adjacent second sub connector, and the second support arm 10122 may be rotatably connected to an adjacent second sub connector. For a manner of rotatably connecting the second swing arm 10121 to the adjacent second sub connector and a manner of rotatably connecting the second support arm 10122 to the adjacent second sub connector, refer to the foregoing descriptions of the rotatable connections between the second swing arm 10121, and the second support arm 10122 and the second connector 10123. Details are not described herein again. In this application, the second connector 10123 is disposed as a plurality of second sub connectors that are rotatably connected in sequence, so that the second swing arm 10121 and the second support arm 10122 are rotatably connected by using the plurality of second sub connectors. This can effectively improve speed uniformity in a process in which the second swing arm 10121 and the second support arm 10122 rotate around the main shaft assembly 102, so as to improve smoothness of mutual pulling between the second swing arm 10121 and the second support arm 10122.

Figure 16:
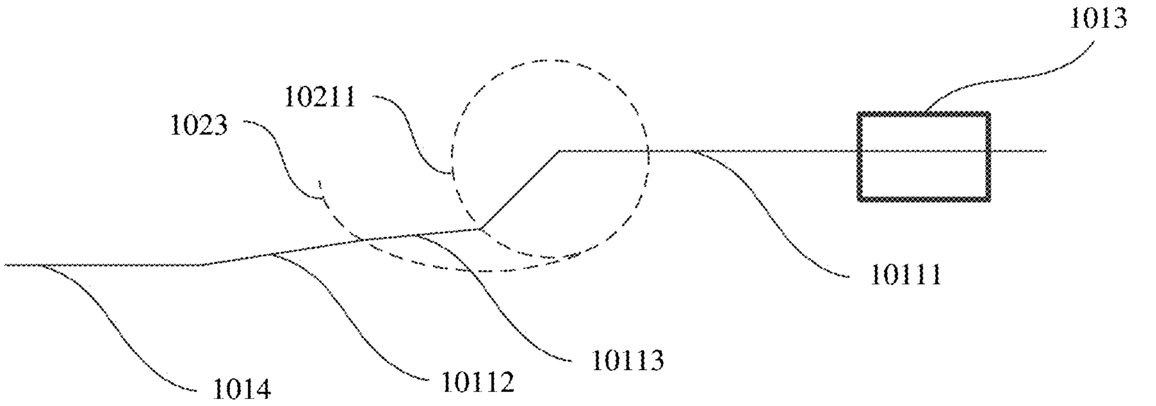
FIG. 16 is a diagram of a principle of a motion mechanism of a hinge mechanism according to an embodiment of this application.

FIG. 16 is a diagram of a principle of a motion mechanism of a hinge mechanism according to an embodiment of this application. Based on the hinge mechanism 1 provided in the foregoing embodiments of this application, in a process in which an electronic device rotates from an unfolded state to a closed state, the first housing fastening bracket 1013 and the second housing fastening bracket 1014 move toward each other. When the first housing fastening bracket 1013 drives the first swing arm 10111 to rotate clockwise around the main shaft assembly 102, the first swing arm 10111 may slide along a groove surface of the second arc-shaped groove 10212, so that the first connector 10113 may be driven to move toward the first swing arm 10111 in the first track slot 1023 of the main shaft assembly 102. In addition, because the first connector 10113 is rotatably connected to the first support arm 10112, in a process in which the first connector 10113 moves toward the first swing arm 10111 in the first track slot 1023 of the main shaft assembly 102, the first support arm 10112 may be driven to rotate anticlockwise around the main shaft assembly 102, so that the first support arm 10112 drives the second housing fastening bracket 1014 to rotate anticlockwise around the main shaft assembly 102. However, in a process in which the electronic device rotates from the closed state to the unfolded state, the first housing fastening bracket 1013 and the second housing fastening bracket 1014 move away from each other. When the first housing fastening bracket 1013 drives the first swing arm 10111 to rotate anticlockwise around the main shaft assembly 102, the first swing arm 10111 may drive the first connector 10113 to move toward the first support arm 10112 in the first track slot 1023 of the main shaft assembly 102, so as to drive the first support arm 10112 to rotate clockwise around the main shaft assembly 102, and drive the second housing fastening bracket 1014 to rotate clockwise around the main shaft assembly 102 by using the first support arm 10112. In this way, folding and unfolding functions of the hinge mechanism 1 are implemented.

Based on the foregoing structural relationship, a cross section of the first connector 10113 may be small, so that the first connector 10113 can shuttle in the first track slot 1023 of the main shaft assembly 102. In addition, because the first connector 10113 extends by a sufficient length in a direction perpendicular to an axial direction, and separately has a connection relationship with the first swing arm 10111 and the first support arm 10112, reliability of the hinge mechanism 1 can be ensured. In this way, a thickness of the main shaft assembly 102 and an overall thickness can be reduced, and reliability of the hinge mechanism 1 can be maintained, so that the entire hinge mechanism 1 is light and thin and reliable.

In addition, because the first connector 10113 may move in the first track slot 1023 based on a specified trajectory, motion of the first connector 10113 in an entire folding and unfolding process may be prevented from being uncontrolled, and motion randomness of the first housing fastening bracket 1013 and the second housing fastening bracket 1014 may be avoided. Therefore, structural and motion stability of the entire hinge mechanism 1 is ensured. In some cases, the first track slot 1023 is properly designed, so that an outer tangent line of the hinge mechanism 1 can keep a constant length in the entire folding and unfolding process, and a flexible display covering a surface of the hinge mechanism 1 can also basically keep a length unchanged. This can effectively avoid squeezing or pulling on the flexible display, to improve structural reliability of the flexible display, and further improve structural reliability of the electronic device.

Refer to FIG. 4 again. In this embodiment of this application, the second rotating assembly 1012 may also be located between the first housing fastening bracket 1013 and the second housing fastening bracket 1014. The second swing arm 10121 may be slidably connected to the second housing fastening bracket 1014. During specific implementation, the second housing fastening bracket 1014 is provided with a second sliding slot 10141, and the second sliding slot 10141 and the second mounting part 10142 are disposed at an interval in a length direction of the hinge mechanism 1. The second sliding slot 10141 extends in a second direction, and the second swing arm 10121 may be mounted in the second sliding slot 10141, and may slide in the second sliding slot 10141 in the second direction. The second direction may be a direction in which the second housing fastening bracket 1014 moves toward or away from the base 1021. In addition, to prevent the second swing arm 10121 from falling off from the second sliding slot 10141, a second sliding rail may be disposed on a slot wall of the second sliding slot 10141, and a second sliding block may be disposed on the second swing arm 10121. In this way, the second sliding block may be fastened on the second sliding rail, and the second sliding block may slide along the second sliding rail, to limit the second swing arm 10121 in the second sliding slot 10141. In addition, the second sliding rail is disposed on the slot wall of the second sliding slot 10141 to provide guide for sliding of the second swing arm 10121 along the second sliding slot 10141, so that motion stability of the second swing arm 10121 is improved.

In addition, the second support arm 10122 may be rotatably connected to the first housing fastening bracket 1013. During specific implementation, the first housing fastening bracket 1013 has a first mounting part 10132. In a length direction of the hinge mechanism 1, the first mounting part 10132 and the first sliding slot 10131 are disposed at an interval. An end part that is of the second support arm 10122 and that faces the first housing fastening bracket 1013 is mounted on the first mounting part 10132, and an end part that is of the second support arm 10122 and that faces the first housing fastening bracket 1013 is rotatably connected to the first mounting part 10132.

In this embodiment of this application, a specific manner in which the end part that is of the second support arm 10122 and that faces the first housing fastening bracket 1013 is rotatably connected to the first mounting part 10132 is not limited. For example, still refer to FIG. 4. The first mounting part 10132 may be provided with a third mounting hole, and an end part that is of the second support arm 10122 and that faces the first housing fastening bracket 1013 is provided with a fourth mounting hole. In this case, the end part that is of the second support arm 10122 and that faces the first housing fastening bracket 1013 may be rotatably connected to the first mounting part 10132 through a rotating shaft that penetrates both the third mounting hole and the fourth mounting hole.

Based on the hinge mechanism 1 provided in the foregoing embodiments of this application, in a process in which the electronic device rotates from the unfolded state to the closed state, the first housing fastening bracket 1013 and the second housing fastening bracket 1014 move toward each other. When the second housing fastening bracket 1014 drives the second swing arm 10121 to rotate anticlockwise around the main shaft assembly 102, the second swing arm

10121 may drive the second connector 10123 to move toward the second swing arm 10121 in the second track slot 1024 of the main shaft assembly 102. In addition, because the second connector 10123 is rotatably connected to the second support arm 10122, in a process in which the second connector 10123 moves toward the second swing arm 10121 in the second track slot 1024 of the main shaft assembly 102, the second support arm 10122 may be driven to rotate clockwise around the main shaft assembly 102, so that the second support arm 10122 drives the first housing fastening bracket 1013 to rotate clockwise around the main shaft assembly 102. However, in a process in which the electronic device rotates from the closed state to the unfolded state, the first housing fastening bracket 1013 and the second housing fastening bracket 1014 move away from each other. When the second housing fastening bracket 1014 drives the second swing arm 10121 to rotate clockwise around the main shaft assembly 102, the second swing arm 10121 may drive the second connector 10123 to move toward the second support arm 10122 in the second track slot 1024 of the main shaft assembly 102, so as to drive the second support arm 10122 to rotate anticlockwise around the main shaft assembly 102, and drive the first housing fastening bracket 1013 to rotate anticlockwise around the main shaft assembly 102 by using the second support arm 10122. In this way, folding and unfolding functions of the hinge mechanism 1 can be implemented.

Based on the foregoing structural relationship, a cross section of the second connector 10123 may be small, so that the second connector 10123 can shuttle in the second track slot 1024 of the main shaft assembly 102. In addition, because the second connector 10123 extends by a sufficient length in a direction perpendicular to an axial direction, and separately has a connection relationship with the second swing arm 10121 and the second support arm 10122, reliability of the hinge mechanism 1 can be ensured. In this way, a thickness of the main shaft assembly 102 and an overall thickness can be reduced, and reliability of the hinge mechanism 1 can be maintained, so that the entire hinge mechanism 1 is light and thin and reliable.

Because the second connector 10123 may move based on a specified trajectory, motion of the second connector 10123 in an entire folding and unfolding process may be prevented from being uncontrolled, and motion randomness of the first housing fastening bracket 1013 and the second housing fastening bracket 1014 may be avoided. Therefore, structural and motion stability of the entire hinge mechanism 1 is ensured. In some cases, the second track slot 1024 is properly designed, so that an outer tangent line of the hinge mechanism 1 can keep a constant length in the entire folding and unfolding process, and a flexible display covering a surface of the hinge mechanism 1 can also basically keep a length unchanged. This can effectively avoid squeezing or pulling on the flexible display, to improve structural reliability of the flexible display and further improve structural reliability of the electronic device.

Figure 17:
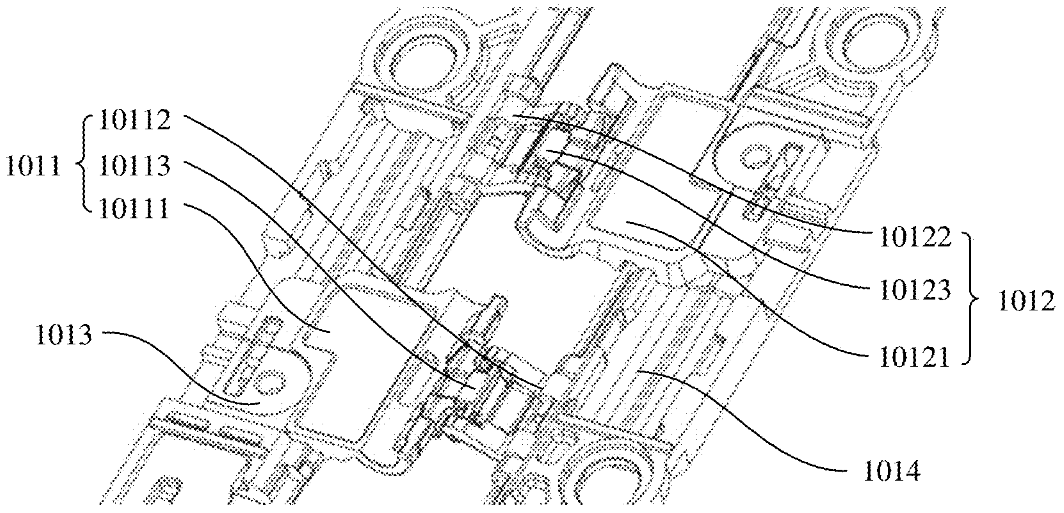
FIG. 17 is a diagram of a partial structure of a hinge mechanism according to an embodiment of this application.

FIG. 17 is a diagram of a partial structure of the hinge mechanism 1 according to an embodiment of this application, and a main shaft assembly is omitted in FIG. 17, to describe a relationship in which the first rotating assembly 1011 and the second rotating assembly 1012 pull each other. In this application, the first swing arm 10111 is slidingly connected to the first housing fastening bracket 1013, the first support arm 10112 is rotatably connected to the second housing fastening bracket 1014, and the first swing arm 10111 may pull the first support arm 10112 by using the first connector 10113 to move based on a specified trajectory. In addition, the second swing arm 10121 is slidably connected to the second housing fastening bracket 1014, the second support arm 10122 is rotatably connected to the first housing fastening bracket 1013, and the second swing arm 10121 may pull the second support arm 10122 by using the second connector 10123 to move based on a specified trajectory. In this way, a distance of moving the first housing fastening bracket 1013 and the second housing fastening bracket 1014 toward or away from the main shaft assembly 102 may be limited, so that when the electronic device is in any folding status, distances between the first housing fastening bracket 1013 and the second housing fastening bracket 1014 and the main shaft assembly 102 are equal. In addition, in a process in which an electronic device rotates from an unfolded state to a closed state and in a process in which the electronic device rotates from the closed state to the unfolded state, distances of moving the first housing fastening bracket 1013 relative to the main shaft assembly 102 are equal, and distances of moving the second housing fastening bracket 1014 relative to the main shaft assembly 102 are equal. In this way, when the hinge mechanism 1 is used in the electronic device shown in FIG. 2*b*, an extension length of a support surface formed by the first housing, the second housing, and the hinge mechanism 1 in the unfolded state can adapt to a flattened length of the flexible display, and when the electronic device is in the closed state, a folding requirement of a foldable part of the flexible display can be met, so that deformation of the flexible display can be avoided, and a squeezing or pulling stress on the flexible display can be reduced, to prolong a service life of the flexible display and improve reliability of the electronic device.

After the rotating module of the hinge mechanism is described, the following describes the damping module in detail. It should be understood that the foregoing embodiments are merely possible implementations of the rotating module to implement folding and unfolding functions of the electronic device. In another embodiment, the rotating module may alternatively be implemented in another manner. The damping module in embodiments of this application is applicable to a hinge mechanism in which a swing arm of a rotating module is slidably connected to a housing fastening bracket.

Refer to FIG. 4 again. In this embodiment of this application, the hinge mechanism 1 may include one damping module, or may include a plurality of damping modules. When the hinge mechanism 1 includes one damping module, the damping module may be disposed corresponding to one of the rotating modules 101 of the hinge mechanism. When the hinge mechanism includes a plurality of damping modules, the plurality of damping modules may be arranged at intervals in an axial direction of the hinge mechanism 1, and the plurality of damping modules may be disposed in a one-to-one correspondence with the plurality of rotating modules 101 of the hinge mechanism 1.

In this embodiment, the damping module may include a first damping assembly 1031 and a second damping assembly 1032. The first damping assembly 1031 and the second damping assembly 1032 are respectively disposed on two sides of the main shaft assembly, the first damping assembly 1031 is disposed corresponding to the first rotating assembly 1011, and the second damping assembly 1032 is disposed corresponding to the second rotating assembly 1012.

Figure 18:
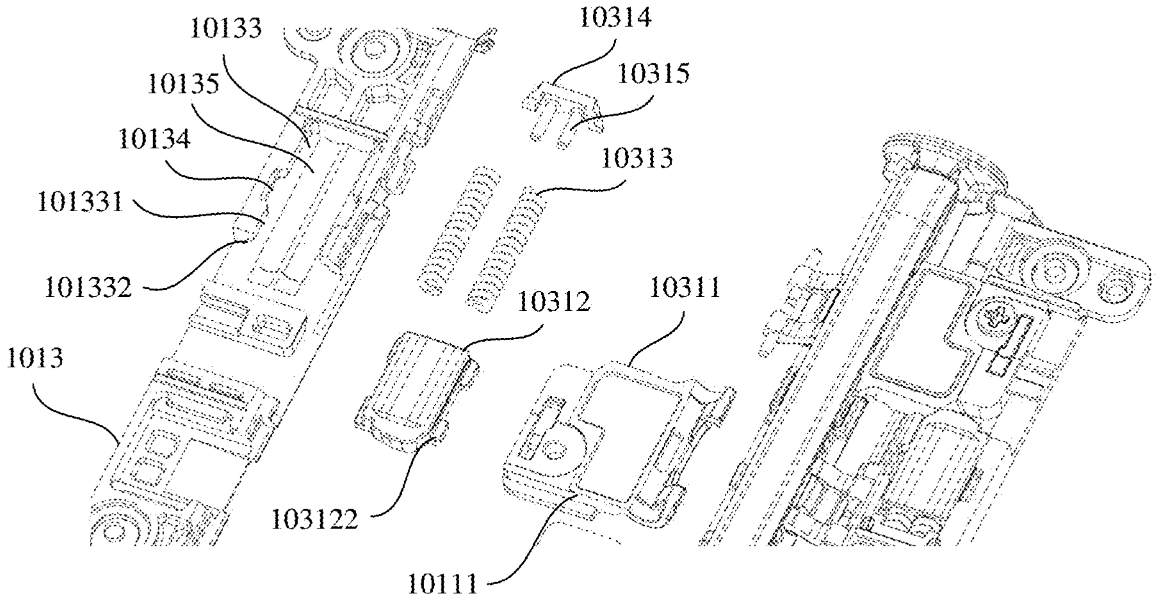
FIG. 18 is another diagram of a partial structure of a hinge mechanism according to an embodiment of this application.
Figure 19:
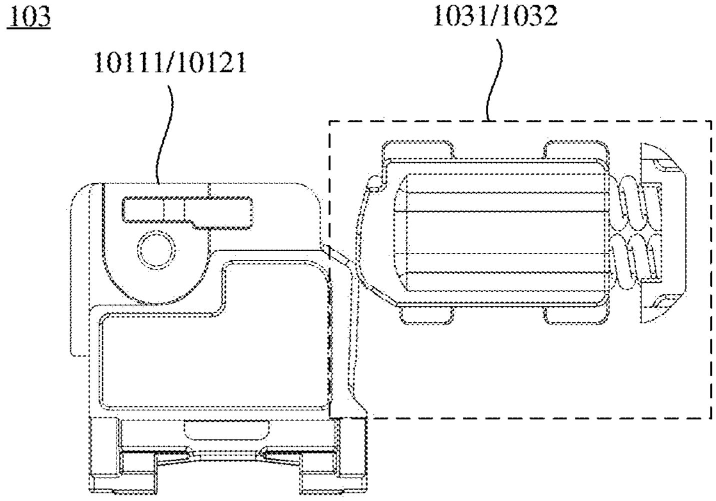
FIG. 19 is a diagram of a partial structure of a damping module according to an embodiment of this application.
Figure 20:
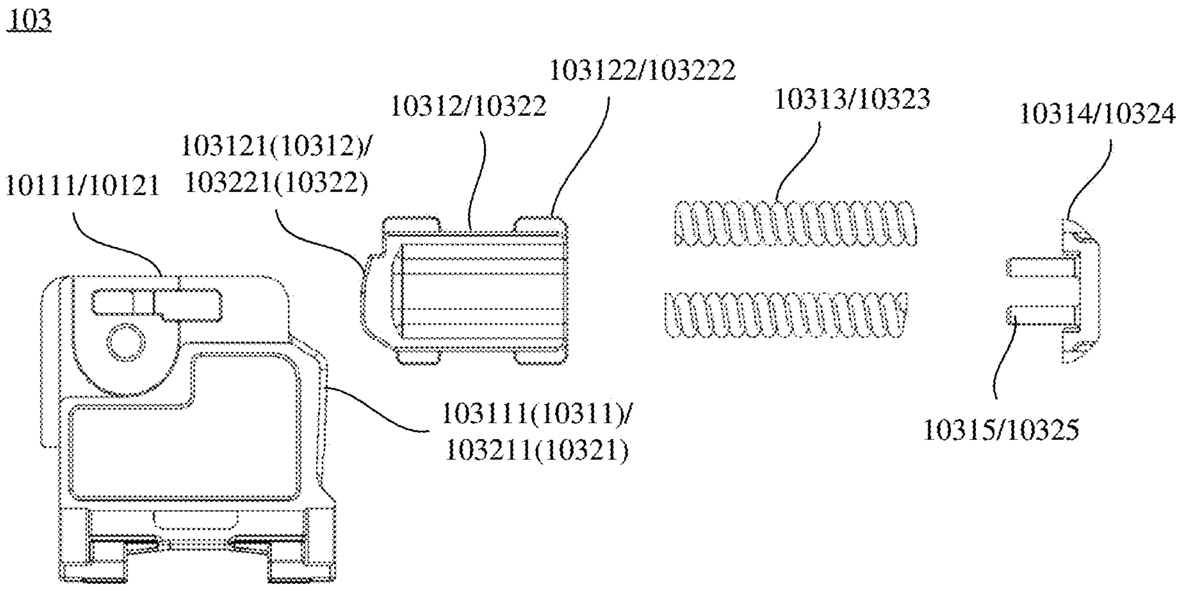
FIG. 20 is an exploded view of a partial structure of a damping module according to an embodiment of this application.

FIG. 18 is another diagram of a partial structure of the hinge mechanism 1 according to an embodiment of this application. FIG. 19 is a diagram of a partial structure of the damping module 103 according to an embodiment of this application. FIG. 20 is a diagram of a partial exploded structure of the damping module 103 according to an embodiment of this application. Refer to FIG. 18 to FIG. 20. In this embodiment of this application, the first damping assembly 1031 may include a first cam 10311, a second cam 10312, a first elastic member 10313, and a first limiting block 10314. The first cam 10311 may be disposed on a side that is of the first swing arm 10111 and that is in an axial direction of the hinge mechanism 1, and a side that is of the first cam 10311 and that is away from the first swing arm 10111 is provided with a first cam surface 103111. The second cam 10312 may be disposed on a side that is of the first cam 10311 and that is away from the first swing arm 10111, the second cam 10312 is slidably disposed on the first housing fastening bracket 1013 in the axial direction of the hinge mechanism 1, and a side that is of the second cam 10312 and that faces the first cam 10311 is provided with a second cam surface 103121. The first limiting block 10314 is disposed on a side that is of the second cam 10312 and that is away from the first swing arm 10111, and the first limiting block 10314 is fastened to the first housing fastening bracket 1013. The first elastic member 10313 is limited between the second cam 10312 and the first limiting block 10314, to apply elastic force to the second cam 10312, so that the second cam surface 103121 of the second cam 10312 abuts against the first cam surface 103111 of the first cam 10311.

During specific implementation, the first cam 10311 may be fastened to a side surface of the first swing arm 10111 through bonding, welding, riveting or the like. Alternatively, the first cam 10311 and the first swing arm 10111 may be of an integrated structure. It may also be understood that the first cam surface 103111 may be directly formed on a side surface of the first swing arm 10111. This helps simplify manufacturing and assembly processes of the hinge mechanism 1.

In this embodiment, the first housing fastening bracket 1013 may be provided with a first limiting slot 10133, the first limiting slot 10133 may extend in the axial direction of the hinge mechanism 1, and the first limiting slot 10133 has a first opening 101331 provided facing the first swing arm 10111. In this case, the first limiting block 10314 may be fastened in the first limiting slot 10133, and the second cam 10312 may be slidably disposed in the first limiting slot 10133. In addition, the second cam surface 103121 of the second cam 10312 may abut against the first cam surface 103111 of the first cam 10311 through the first opening 101331. In this way, a movement direction of the second cam 10312 driven by the first elastic member 10313 may be limited by using the first limiting slot 10133, to improve structural stability and reliability of the first damping assembly 1031. In addition, the second cam 10312 and the first housing fastening bracket 1013 may overlap or partially overlap in a thickness direction of the hinge mechanism 1, so that a thickness of the hinge mechanism 1 can be reduced. In this way, the electronic device in which the hinge mechanism 1 is used can implement a light and thin design.

In an implementation, a slot wall that is of the first limiting slot 10133 and that is opposite to the first opening 101331 may form a first limiting block 10314. In other words, the first limiting block 10314 and the first housing fastening bracket 1013 are of an integrated structure. In this way, a structure of the hinge mechanism 1 can be simplified, and structural compactness of the hinge mechanism 1 can be improved.

In another implementation, the first limiting block 10314 may alternatively be fastened in the first limiting slot 10133 through bonding, welding, riveting or the like, for example, may be fastened to a side that is of the first limiting slot 10133 and that is opposite to the first opening 101331. In this design, the first limiting block 10314 and the first housing fastening bracket 1013 are independent of each other, so that processing difficulty of the first limiting block 10314 and the first housing fastening bracket 1013 can be reduced. This helps reduce processing costs of the hinge mechanism 1.

Still refer to FIG. 18 to FIG. 20. In this embodiment of this application, a slot wall of the first limiting slot 10133 may be provided with a first guide slot 101332, and the first guide slot 101332 extends in the axial direction of the hinge mechanism 1. A side surface of the second cam 10312 may be provided with a first guide block 103122, and the first guide block 103122 is located in the first guide slot 101332, and may slide in the first guide slot 101332. Though fitting between the first guide block 103122 and the first guide slot 101332, a sliding direction of the second cam 10312 in the first limiting slot 10133 may be limited. In addition, guide may be provided for sliding of the second cam 10312 in the first limiting slot 10133, to reduce a risk that the second cam 10312 slips out of the first limiting slot 10133, and improve motion stability of the second cam 10312.

During specific implementation, slot walls on two sides of the first limiting slot 10133 may be respectively provided with first guide slots 101332. Correspondingly, first guide blocks 103122 may be respectively disposed on two side surfaces of the second cam 10312. In this way, the guide blocks and the guide slots fit each other on the two sides of the second cam 10312 to guide and limit the second cam 10312, so as to further improve motion stability of the second cam 10312. In addition, the first housing fastening bracket 1013 may be further provided with a first avoidance groove 10134. The first avoidance groove 10134 communicates with the first guide slot 101332. When the first cam 10311 is mounted in the first limiting slot 10133, the first avoidance groove 10134 may avoid the first guide block 103122 of the second cam 10312. In this way, the first guide block 103122 of the second cam 10312 passes through the first avoidance groove 10134 and smoothly enters the first guide slot 101332. This reduces difficulty of mounting the second cam 10312 on the first housing fastening bracket 1013.

Still refer to FIG. 18 to FIG. 20. In some embodiments, the first elastic member 10313 may be a spring. A quantity of springs may be set based on parameters such as a magnitude of damping force that needs to be provided by the first damping assembly 1031 and space of the hinge mechanism 1. For example, the figure shows a case in which two springs are used, and the two springs may be disposed between the second cam 10312 and the first limiting block 10314 in parallel. In addition, the first damping assembly 1031 may further include a first guide post 10315 that is disposed corresponding to each spring. The first guide post 10315 may be fastened to a side that is of the first limiting block 10314 and that faces the second cam 10312, or may be fastened to a side that is of the second cam 10312 and that faces the first limiting block 10314. This is not limited in this application. The first guide post 10315 extends in the axial direction of the hinge mechanism 1, and the spring may be sleeved on the corresponding first guide post 10315, to reduce a risk of displacement of the spring when elastic deformation occurs.

Certainly, in some other embodiments, the first elastic member 10313 may alternatively be a spring sheet. There may be a plurality of spring sheets, and the plurality of spring sheets may be stacked between the second cam 10312 and the first limiting block 10314.

During a specific implementation, a first groove (not shown in the figure) may be provided on a side that is of the second cam 10312 and that faces the first housing fastening bracket 1013, and a second groove 10135 may be provided at a position that is on the first housing fastening bracket 1013 and that corresponds to the first groove. After the second cam 10312 is mounted on the first housing fastening bracket 1013, the first groove and the second groove 10135 may enclose space, and the first elastic member 10313 may be disposed in the space. It should be understood that when the first housing fastening bracket 1013 is provided with the first limiting slot 10133, a bottom wall of the first limiting slot 10133 may be specifically provided with the second groove 10135.

Based on the foregoing design, the first elastic member 10313 can be limited through the space enclosed by the first groove and the second groove 10135. In addition, because the space is enclosed by the two grooves, depths of the two grooves are small. In this way, on the premise of not affecting structural strength of the second cam 10312 and the first housing fastening bracket 1013, a thickness of the second cam 10312 and a thickness of the first housing fastening bracket 1013 can be appropriately reduced. This helps reduce an overall thickness of the hinge mechanism 1.

In this embodiment of this application, each of the first cam surface 103111 and the second cam surface 103121 may include a plurality of convex parts and concave parts. When slopes of the convex parts of the two cam surfaces are in contact with each other, damping force that prevents the two cam surfaces from continuing to rotate relative to each other may be generated between the two cam surfaces. Curved surface contours of the first cam surface 103111 and the second cam surface 103121 are properly designed, so that in a closing process of the hinge mechanism 1, as the first swing arm 10111 rotates, the first cam 10311 can push the second cam 10312 toward the first limiting block 10314, to compress the first elastic member 10313. In this way, a user can have an obvious operation feeling, and user experience is improved. In an unfolding process of the hinge mechanism 1, the first elastic member 10313 gradually rebounds in a compressed state, and releases accumulated elastic potential energy, to push the second cam 10312 to slide toward the first cam 10311. In this way, the second cam 10312 may apply torsion force to the first cam 10311 and the first swing arm 10111 to facilitate rotation of the first cam 10311 and the first swing arm 10111, so as to provide specific unfolding assistance for the hinge mechanism 1. Therefore, difficulty of an unfolding operation of the hinge mechanism 1 is reduced.

In addition, in this embodiment of this application, the first cam surface 103111 and the second cam surface 103121 are properly designed, so that the first cam 10311 and the first swing arm 10111 can suspend at a specified angle, that is, the first rotating assembly suspends. When the hinge mechanism 1 is used in an electronic device, a suspendable design of the first rotating assembly may be used to enable the electronic device to be positioned in some intermediate states, thereby further helping improve user experience.

Refer to FIG. 18 to FIG. 20 again. A structure of the second damping assembly 1032 is similar to that of the first damping assembly 1031. When the second damping assembly 1032 is specifically disposed, the second damping assembly may include a third cam 10321, a fourth cam 10322, a second elastic member 10323, and a second limiting block 10324. The third cam 10321 may be disposed on a side that is of the second swing arm 10121 and that is in the axial direction of the hinge mechanism 1, and a side that is of the third cam 10321 and that is away from the second swing arm 10121 is provided with a third cam surface 103211. The fourth cam 10322 may be disposed on a side that is of the third cam 10321 and that is away from the second swing arm 10121, and the fourth cam 10322 is slidably disposed on the second housing fastening bracket in the axial direction of the hinge mechanism 1, and a side that is of the fourth cam 10322 and that faces the third cam 10321 is provided with a fourth cam surface 103221. The second limiting block 10324 is disposed on a side that is of the fourth cam 10322 and that is away from the second swing arm 10121, and the second limiting block 10324 is fastened to the second housing fastening bracket. The second elastic member 10323 is limited between the fourth cam 10322 and the second limiting block 10324, to apply elastic force to the fourth cam 10322, so that the fourth cam surface 103221 of the fourth cam 10322 abuts against the third cam surface 103211 of the third cam 10321.

During specific implementation, the third cam 10321 and the second swing arm 10121 may be of an integrated structure, so that a side surface of the second swing arm 10121 forms the third cam surface 103211 of the third cam 10321. Alternatively, the third cam 10321 may be fastened to a side surface of the second swing arm 10121 through bonding, welding, riveting or the like.

The second housing fastening bracket may be provided with a second limiting slot in the axial direction of the hinge mechanism, the second limiting slot has a second opening disposed facing the second swing arm, the second limiting block 10324 may be fastened in the second limiting slot, the fourth cam 10322 may be slidably disposed in the second limiting slot, and the fourth cam surface 103221 of the fourth cam 10322 may abut against the third cam surface 103211 of the third cam 10321 through the second opening. In this way, a movement direction of the fourth cam 10322 driven by the second elastic member 10323 may be limited by using the second limiting slot, to improve structural stability and reliability of the second damping assembly 1032. In addition, the fourth cam 10322 and the second housing fastening bracket may overlap or partially overlap in a thickness direction of the hinge mechanism 1, so that a thickness of the hinge mechanism 1 can be reduced. In this way, the electronic device in which the hinge mechanism 1 is used can implement a light and thin design.

In an implementation, the second limiting block 10324 and the second housing fastening bracket may be of an integrated structure. For example, a slot wall that is of the second limiting slot and that is opposite to the second opening may form the second limiting block 10324. In another implementation, the second limiting block 10324 may alternatively be fastened in the second limiting slot through bonding, welding, riveting or the like, for example, may be fastened to a side that is of the second limiting slot and that is opposite to the second opening.

In this embodiment of this application, a slot wall of the second limiting slot may be provided with a second guide slot extending in the axial direction of the hinge mechanism, and a second guide block 103222 may be disposed on a side surface of the fourth cam 10322. The second guide block 103222 is slidably disposed in the second guide slot, so that a sliding direction of the fourth cam 10322 in the second limiting slot is limited through fitting of the second guide block 103222 and the second guide slot. In addition, guide for the sliding of the fourth cam 10322 is provided, to reduce a risk that the fourth cam 10322 slips out of the second limiting slot, and improve motion stability of the fourth cam 10322.

In addition, the second housing fastening bracket may be further provided with a second avoidance groove, and the second avoidance groove communicates with the second guide slot. When the fourth cam 10322 is mounted in the second limiting slot, the second avoidance groove may avoid the second guide block 103222 of the fourth cam 10322, so that the second guide block 103222 of the fourth cam 10322 smoothly enters the second guide slot. In this way, difficulty of mounting the fourth cam 10322 in the second housing fastening bracket is reduced.

Still refer to FIG. 18 to FIG. 20. In embodiments of this application, the second elastic member 10323 may be a spring. A quantity of springs may be set based on parameters such as a magnitude of damping force that needs to be provided by the second damping assembly 1032 and space of the hinge mechanism 1. For example, the figure shows a case in which the second elastic member 10323 includes two springs, and the two springs may be disposed between the fourth cam 10322 and the second limiting block 10324 in parallel. In addition, the second damping assembly 1032 may further include a second guide post 10325 that is disposed corresponding to each spring. The second guide post 10325 may be fastened to a side that is of the second limiting block 10324 and that faces the fourth cam 10322, or may be fastened to a side that is of the fourth cam 10322 and that faces the second limiting block 10324. This is not limited in this application. The second guide post 10325 extends in the axial direction of the hinge mechanism 1, and the spring may be sleeved on the corresponding second guide post 10325, to reduce a risk of displacement of the spring when elastic deformation occurs.

In some other embodiments, the second elastic member 10323 may alternatively be a spring sheet. There may be a plurality of spring sheets, and the plurality of spring sheets may be stacked between the fourth cam 10322 and the second limiting block 10324.

During a specific implementation, a third groove may be provided on a side that is of the fourth cam 10322 and that faces the second housing fastening bracket, and a fourth groove may be provided at a position that is on the second housing fastening bracket and that corresponds to the third groove. After the fourth cam 10322 is mounted on the second housing fastening bracket, the third groove and the fourth groove may enclose space, and the second elastic member 10323 may be disposed in the space. It should be understood that when the second housing fastening bracket is provided with the second limiting slot, a bottom wall of the first limiting slot may be specifically provided with the fourth groove. Based on the foregoing design, the second elastic member 10323 can be limited through the space enclosed by the third groove and the fourth groove. In addition, because the space is enclosed by the two grooves, depths of the two grooves are small. In this way, on the premise of not affecting structural strength of the fourth cam 10322 and the second housing fastening bracket, a thickness of the fourth cam 10322 and a thickness of the second housing fastening bracket can be appropriately reduced. This helps reduce an overall thickness of the hinge mechanism 1.

In this embodiment of this application, each of the third cam surface 103211 and the fourth cam surface 103221 may include a plurality of convex parts and concave parts. When slopes of the convex parts of the two cam surfaces are in contact with each other, damping force that prevents the two cam surfaces from continuing to rotate relative to each other may be generated between the two cam surfaces. Curved surface contours of the third cam surface 103211 and the fourth cam surface 103221 are properly designed, so that in a closing process of the hinge mechanism 1, as the second swing arm 10121 rotates, the third cam 10321 can push the fourth cam 10322 toward the second limiting block 10324, to compress the second elastic member 10323. In this way, a user can have an obvious operation feeling, and user experience is improved. In an unfolding process of the hinge mechanism 1, the second elastic member 10323 gradually rebounds in a compressed state, and releases accumulated elastic potential energy, to push the fourth cam 10322 to slide toward the third cam 10321. In this way, the fourth cam 10322 may apply torsion force to the third cam 10321 and the second swing arm 10121 to facilitate rotation of the third cam 10321 and the second swing arm 10121, so as to provide specific unfolding assistance for the hinge mechanism 1. Therefore, difficulty of an unfolding operation of the hinge mechanism 1 is reduced.

In addition, in this embodiment of this application, the third cam surface 103211 and the fourth cam surface 103221 are properly designed, so that the third cam 10321 and the second swing arm 10121 can suspend at a specified angle, that is, the second rotating assembly suspends. When the hinge mechanism 1 is used in an electronic device, a suspendable design of the second rotating assembly may be used to enable the electronic device to be positioned in some intermediate states, thereby further helping improve user experience.

Figure 21:
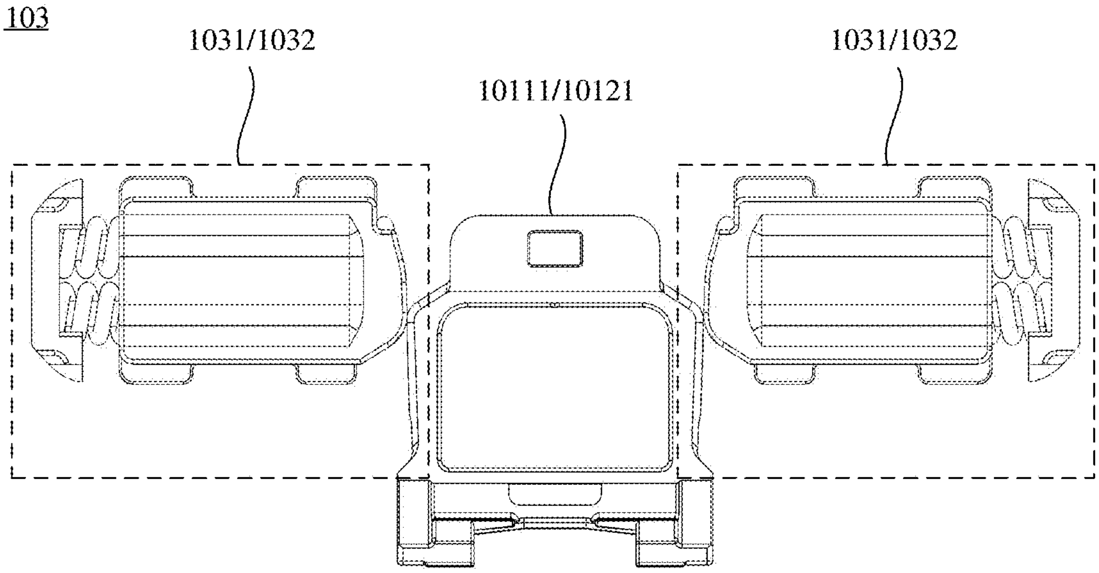
FIG. 21 is a diagram of a partial structure of another damping module according to an embodiment of this application.

FIG. 21 is a diagram of a partial structure of another damping module according to an embodiment of this application. Refer to FIG. 21. In this embodiment of this application, in this embodiment of this application, the damping module may also include a first damping assembly 1031 and a second damping assembly 1032. Structures of the first damping assembly 1031 and the second damping assembly 1032 may be designed with reference to the descriptions in the foregoing embodiments. Details are not described herein again.

Different from the foregoing embodiments, in this embodiment, there are two first damping assemblies 1031 and two second damping assemblies 1032. The two first damping assemblies 1031 may be symmetrically disposed on two sides that are of the first swing arm 10111 and that are in the axial direction of the hinge mechanism, so that force on the two sides of the first swing arm 10111 is balanced, a jamming risk of the first swing arm 10111 is reduced, and motion reliability of the first swing arm 10111 is improved. Similarly, the two second damping assemblies 1032 may be symmetrically disposed on two sides that are of the second swing arm 10121 and that are in the axial direction of the hinge mechanism, so that force on the two sides of the second swing arm 10121 is balanced, a jamming risk of the second swing arm 10121 is reduced, and motion reliability of the second swing arm 10121 is improved.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A hinge mechanism, comprising:

a main shaft;

a first housing fastening bracket;

a second housing fastening bracket, wherein the first housing fastening bracket and the second housing fastening bracket are respectively disposed on opposite sides of the main shaft;

a rotating module comprising a first swing arm and a second swing arm, wherein the first swing arm is rotatably connected to the main shaft, the first swing arm is slidably connected to the first housing fastening bracket, the second swing arm is rotatably connected to the main shaft, and the second swing arm is slidably connected to the second housing fastening bracket; and a damping module, comprising a first damping assembly and a second damping assembly, wherein the first damping assembly comprises a first cam, a second cam, a first elastic member, and a first limiting block, the first cam is disposed on a side of the first swing arm that is in an axial direction of the hinge mechanism, the second cam is located on a side of the first cam that faces away from the first swing arm, the second cam is slidably disposed on the first housing fastening bracket in the axial direction of the hinge mechanism, a cam surface of the second cam abuts against a cam surface of the first cam, the first limiting block is on a side of the second cam that faces away from the first swing arm, the first limiting block is fastened to the first housing fastening bracket, and two ends of the first elastic member respectively abut against the second cam and the first limiting block, and wherein a major axis of the first elastic member is parallel to a major axis of the main shaft, and the first elastic member is configured to exert elastic force in a direction parallel to the major axis of the first elastic member; and wherein the second damping assembly comprises a third cam, a fourth cam, a second elastic member, and a second limiting block, the third cam is on a side of the second swing arm that is in the axial direction of the hinge mechanism, the fourth cam is located on a side of the third cam that faces away from the second swing arm, the fourth cam is slidably disposed on the second housing fastening bracket in the axial direction of the hinge mechanism, a cam surface of the fourth cam abuts against a cam surface of the third cam, the second limiting block is on a side of the fourth cam that faces away from the second swing arm, the second limiting block is fastened to the second housing fastening bracket, and two ends of the second elastic member respectively abut against the fourth cam and the second limiting block, and wherein a major axis of the second elastic member is parallel to the major axis of the main shaft, and the second elastic member is configured to exert elastic force in a direction parallel to the major axis of the second elastic member.

2. The hinge mechanism according to claim 1, wherein a first limiting slot extends in the first housing fastening bracket in the axial direction of the hinge mechanism, a first opening of the first limiting slot faces the first swing arm, the first limiting block is fastened in the first limiting slot, the second cam is slidably disposed in the first limiting slot, and the cam surface of the second cam abuts against the cam surface of the first cam through the first opening; and wherein a second limiting slot extends in the second housing fastening bracket in the axial direction of the hinge mechanism, a second opening of the second limiting slot faces the second swing arm, the second limiting block is fastened in the second limiting slot, the fourth cam is slidably disposed in the second limiting slot, and the cam surface of the fourth cam abuts against the cam surface of the third cam through the second opening.

3. The hinge mechanism according to claim 2, wherein a sidewall of the first limiting slot that is opposite to the first opening defines the first limiting block; and wherein a sidewall of the second limiting slot that is opposite to the second opening defines the second limiting block.

4. The hinge mechanism according to claim 2, wherein a first guide slot extends in a sidewall of the first limiting slot in the axial direction of the hinge mechanism, the second cam comprises a first guide block, and the first guide block is slidably disposed in the first guide slot; and wherein a second guide slot extends in a sidewall of the second limiting slot in the axial direction of the hinge mechanism, the fourth cam comprises a second guide block, and the second guide block is slidably disposed in the second guide slot.

5. The hinge mechanism according to claim 1, wherein a first groove extends in a side of the second cam that faces the first housing fastening bracket, a second groove extends in the first housing fastening bracket in a position that corresponds to the first groove, and the first elastic member is located in a space enclosed by the first groove and the second groove; and wherein a third groove extends in a side of the fourth cam that faces the second housing fastening bracket, a fourth groove extends in the second housing fastening bracket at a position that corresponds to the third groove, and the second elastic member is located in a space enclosed by the third groove and the fourth groove.

6. The hinge mechanism according to claim 1, wherein the first cam and the first swing arm are structurally integrated; or wherein the second cam and the second swing arm are structurally integrated.

7. The hinge mechanism according to claim 1, wherein the damping module comprises two first damping assemblies, and the two first damping assemblies are symmetrically disposed on two sides that are of the first swing arm and that are in the axial direction of the hinge mechanism; and wherein the damping module comprises two second damping assemblies, and the two second damping assemblies are symmetrically disposed on two sides that are of the second swing arm and that are in the axial direction of the hinge mechanism.

8. The hinge mechanism according to claim 1, wherein the rotating module further comprises a first support arm, a second support arm, a first connector, and a second connector, wherein:

the first support arm is rotatably connected to the second housing fastening bracket, the first connector is between the first swing arm and the first support arm, the first connector is rotatably connected to the first swing arm, and the first connector is rotatably connected to the first support arm;

a first track slot extends in the main shaft, and the first connector is capable of moving along the first track slot, to limit a movement track of the first connector through the first track slot;

the second support arm is rotatably connected to the first housing fastening bracket, the second connector is between the second swing arm and the second support arm, the second connector is rotatably connected to the second swing arm, and the second connector is rotatably connected to the second support arm; and a second track slot extends in the main shaft, and the second connector is capable of moving along the second track slot, to limit a movement track of the second connector through the second track slot.

9. The hinge mechanism according to claim 8, wherein the main shaft comprises a base and a cover plate, a first arc-shaped groove and a third arc-shaped groove extend in the base, the cover plate covers the base, and the cover plate comprises a first protrusion disposed facing the first arc-shaped groove and a third protrusion disposed facing the third arc-shaped groove;

wherein a gap between a surface of the first protrusion and a groove surface of the first arc-shaped groove is the first track slot, the first connector comprises a first arc-shaped surface and a second arc-shaped surface, and when the hinge mechanism is in an unfolded state and a closed state, the first arc-shaped surface abuts against the surface of the first protrusion, and the second arc-shaped surface abuts against the groove surface of the first arc-shaped groove; and wherein a gap between a surface of the third protrusion and a groove surface of the third arc-shaped groove is the second track slot, the second connector comprises a third arc-shaped surface and a fourth arc-shaped surface, and when the hinge mechanism is in the unfolded state and the closed state, the third arc-shaped surface abuts against the surface of the third protrusion, and the fourth arc-shaped surface abuts against the groove surface of the third arc-shaped groove.

10. The hinge mechanism according to claim 9, wherein:

in a process in which the hinge mechanism rotates from the unfolded state to the closed state, the first arc-shaped surface abuts against the surface of the first protrusion, and a gap is between the second arc-shaped surface and the groove surface of the first arc-shaped groove; and in a process in which the hinge mechanism rotates from the closed state to the unfolded state, the second arc-shaped surface abuts against the groove surface of the first arc-shaped groove, and a gap is between the first arc-shaped surface and the surface of the first protrusion;

in the process in which the hinge mechanism rotates from the unfolded state to the closed state, the third arc-shaped surface abuts against the surface of the third protrusion, and a gap is between the fourth arc-shaped surface and the groove surface of the third arc-shaped groove; and in the process in which the hinge mechanism rotates from the closed state to the unfolded state, the fourth arc-shaped surface abuts against the groove surface of the third arc-shaped groove, and a gap is between the third arc-shaped surface and the surface of the third protrusion.

11. The hinge mechanism according to claim 9, wherein:

the surface of the first protrusion is equidistant from the groove surface of the first arc-shaped groove, and in a process in which the hinge mechanism rotates from the unfolded state to the closed state and in a process in which the hinge mechanism rotates from the closed state to the unfolded state, the first arc-shaped surface abuts against the surface of the first protrusion, and the second arc-shaped surface abuts against the groove surface of the first arc-shaped groove; and the surface of the third protrusion is equidistant from the groove surface of the third arc-shaped groove, and in the process in which the hinge mechanism rotates from the unfolded state to the closed state and in the process in which the hinge mechanism rotates from the closed state to the unfolded state, the third arc-shaped surface abuts against the surface of the third protrusion, and the fourth arc-shaped surface abuts against the groove surface of the third arc-shaped groove.

12. The hinge mechanism according to claim 9, wherein the first arc-shaped surface is a circular arc-shaped surface, the second arc-shaped surface is a circular arc-shaped surface, and a sum of a radius of the first arc-shaped surface and a radius of the second arc-shaped surface is equal to a distance between the surface of the first protrusion and the groove surface of the first arc-shaped groove; and wherein the third arc-shaped surface is a circular arc-shaped surface, the fourth arc-shaped surface is a circular arc-shaped surface, and a sum of a radius of the third arc-shaped surface and a radius of the fourth arc-shaped surface is equal to a distance between the surface of the third protrusion and the groove surface of the third arc-shaped groove.

13. An electronic device, comprising:

a first housing;

a second housing;

a flexible display; and a hinge mechanism, wherein:

the first housing and the second housing are respectively disposed on opposite sides of the hinge mechanism, a first housing fastening bracket of the hinge mechanism is fastened to the first housing, and a second housing fastening bracket of the hinge mechanism is fastened to the second housing;

the flexible display continuously covers the first housing, the second housing, and the hinge mechanism, and the flexible display is fastened to the first housing and the second housing;

the hinge mechanism comprises a main shaft, the first housing fastening bracket, the second housing fastening bracket, a rotating module, and a damping module, wherein the first housing fastening bracket and the second housing fastening bracket are respectively disposed on opposite sides of the main shaft;

the rotating module comprises a first swing arm and a second swing arm, the first swing arm is rotatably connected to the main shaft, the first swing arm is slidably connected to the first housing fastening bracket, the second swing arm is rotatably connected to the main shaft, and the second swing arm is slidably connected to the second housing fastening bracket; and the damping module comprises a first damping assembly and a second damping assembly, the first damping assembly comprises a first cam, a second cam, a first elastic member, and a first limiting block, the first cam is disposed on a side of the first swing arm that is in an axial direction of the hinge mechanism, the second cam is located on a side of the first cam that faces away from the first swing arm, the second cam is slidably disposed on the first housing fastening bracket in the axial direction of the hinge mechanism, a cam surface of the second cam abuts against a cam surface of the first cam, the first limiting block is on a side of the second cam that faces away from the first swing arm, the first limiting block is fastened to the first housing fastening bracket, and two ends of the first elastic member respectively abut against the second cam and the first limiting block, and wherein a major axis of the first elastic member is parallel to a major axis of the main shaft, and the first elastic member is configured to exert elastic force in a direction parallel to the major axis of the first elastic member; and the second damping assembly comprises a third cam, a fourth cam, a second elastic member, and a second limiting block, the third cam is disposed on a side of the second swing arm that is in the axial direction of the hinge mechanism, the fourth cam is located on a side of the third cam that faces away from the second swing arm, the fourth cam is slidably disposed on the second housing fastening bracket in the axial direction of the hinge mechanism, a cam surface of the fourth cam abuts against a cam surface of the third cam, the second limiting block is on a side of the fourth cam that faces away from the second swing arm, the second limiting block is fastened to the second housing fastening bracket, and two ends of the second elastic member respectively abut against the fourth cam and the second limiting block, and wherein a major axis of the second elastic member is parallel to the major axis of the main shaft, and the second elastic member is configured to exert elastic force in a direction parallel to the major axis of the second elastic member.

14. The electronic device according to claim 13, wherein a first limiting slot extends in the first housing fastening bracket in the axial direction of the hinge mechanism, a first opening of the first limiting slot faces the first swing arm, the first limiting block is fastened in the first limiting slot, the second cam is slidably disposed in the first limiting slot, and the cam surface of the second cam abuts against the cam surface of the first cam through the first opening; and wherein a second limiting slot extends in the second housing fastening bracket in the axial direction of the hinge mechanism, a second opening of the second limiting slot faces the second swing arm, the second limiting block is fastened in the second limiting slot, the fourth cam is slidably disposed in the second limiting slot, and the cam surface of the fourth cam abuts against the cam surface of the third cam through the second opening.

15. The electronic device according to claim 14, wherein:

a sidewall of the first limiting slot that is opposite to the first opening defines the first limiting block; and a sidewall of the second limiting slot that is opposite to the second opening defines the second limiting block.

16. The electronic device according to claim 14, wherein a first guide slot extends in a sidewall of the first limiting slot in the axial direction of the hinge mechanism, the second cam comprises a first guide block, and the first guide block is slidably disposed in the first guide slot; and wherein a second guide slot extends in a sidewall of the second limiting slot in the axial direction of the hinge mechanism, the fourth cam comprises a second guide block, and the second guide block is slidably disposed in the second guide slot.

17. The electronic device according to claim 13, wherein a first groove extends in a side of the second cam that faces the first housing fastening bracket, a second groove extends in the first housing fastening bracket at a position that corresponds to the first groove, and the first elastic member is located in a space enclosed by the first groove and the second groove; and wherein a third groove extends in a side of the fourth cam that faces the second housing fastening bracket, a fourth groove extends in the second housing fastening bracket at a position that corresponds to the third groove, and the second elastic member is located in a space enclosed by the third groove and the fourth groove.

18. The electronic device according to claim 13, wherein the damping module comprises two first damping assemblies, and the two first damping assemblies are symmetrically disposed on two sides that are of the first swing arm and that are in the axial direction of the hinge mechanism; and wherein the damping module comprises two second damping assemblies, and the two second damping assemblies are symmetrically disposed on two sides that are of the second swing arm and that are in the axial direction of the hinge mechanism.

19. The electronic device according to claim 13, wherein the rotating module further comprises a first support arm, a second support arm, a first connector, and a second connector, and wherein:

the first support arm is rotatably connected to the second housing fastening bracket, the first connector is between the first swing arm and the first support arm, the first connector is rotatably connected to the first swing arm, and the first connector is rotatably connected to the first support arm;

a first track slot extends in the main shaft, and the first connector is capable of moving along the first track slot, to limit a movement track of the first connector through the first track slot; and the second support arm is rotatably connected to the first housing fastening bracket, the second connector is located between the second swing arm and the second support arm, the second connector is rotatably connected to the second swing arm, and the second connector is rotatably connected to the second support arm; and a second track slot extends in the main shaft, and the second connector is capable of moving along the second track slot, to limit a movement track of the second connector through the second track slot.

20. The electronic device according to claim 19, wherein the main shaft comprises a base and a cover plate, a first arc-shaped groove and a third arc-shaped groove extend in the base, the cover plate covers the base, and the cover plate comprises a first protrusion disposed facing the first arc-shaped groove and a third protrusion disposed facing the third arc-shaped groove;

wherein a gap between a surface of the first protrusion and a groove surface of the first arc-shaped groove is the first track slot, the first connector comprises a first arc-shaped surface and a second arc-shaped surface, and when the hinge mechanism is in an unfolded state and a closed state, the first arc-shaped surface abuts against the surface of the first protrusion, and the second arc-shaped surface abuts against the groove surface of the first arc-shaped groove; and wherein a gap between a surface of the third protrusion and a groove surface of the third arc-shaped groove is the second track slot, the second connector comprises a third arc-shaped surface and a fourth arc-shaped surface, and when the hinge mechanism is in the unfolded state and the closed state, the third arc-shaped surface abuts against the surface of the third protrusion, and the fourth arc-shaped surface abuts against the groove surface of the third arc-shaped groove.

* * * * *